United States Patent [19]
Takeno et al.

[11] Patent Number: 5,882,407
[45] Date of Patent: Mar. 16, 1999

[54] APPARATUS AND METHOD FOR APPLYING A COATING TO A BASE MATERIAL

[75] Inventors: Kazuta Takeno; Takeo Ito; Shigeo Kasahara; Gen Takayama; Hiroshi Kaneko, all of Kanagawa-ken; Yoshiyuki Sakai, Shizuoka-ken; Toshihiko Kusago, Shizuoka-ken; Katsuhiko Iguchi, Shizuoka-ken, all of Japan

[73] Assignees: Toshiba Battery Co., Ltd.; Toshiba Kikai Kabushiki Kaisha, both of Tokyo, Japan

[21] Appl. No.: 725,313

[22] Filed: Oct. 2, 1996

[30] Foreign Application Priority Data

Oct. 3, 1995 [JP] Japan .................................... 7-256201
Oct. 26, 1995 [JP] Japan .................................... 7-279184

[51] Int. Cl.⁶ ...................................................... B05C 3/12
[52] U.S. Cl. ............................ 118/419; 118/407; 118/411; 118/412; 118/413; 118/668; 118/676; 118/677; 118/681; 425/113
[58] Field of Search ................................... 118/407, 411, 118/412, 413, 419, 668, 676, 677, 681; 427/58, 209, 356, 358; 425/113

[56] References Cited

U.S. PATENT DOCUMENTS

| | | | |
|---|---|---|---|
| 2,766,721 | 10/1956 | Paquette | 118/413 |
| 3,499,418 | 3/1970 | Mayhew | 118/419 |
| 3,896,764 | 7/1975 | Kindl et al. | 118/411 |
| 3,930,464 | 1/1976 | Wallsten | 427/209 |
| 4,245,584 | 1/1981 | Kolosov et al. | 118/411 |
| 4,889,073 | 12/1989 | Meinander | 118/411 |
| 5,453,127 | 9/1995 | Flinchum et al. | 427/209 |

*Primary Examiner*—Peter Chin
*Assistant Examiner*—Michael P. Colaianni
*Attorney, Agent, or Firm*—Finnegan, Henderson, Farabow, Garrett & Dunner, L.L.P.

[57] ABSTRACT

A coating die is disclosed, in which a slit-like spacing 29 is formed between a pair of die elements 25, 27 arranged in opposed relation to each other. A band-shaped electrode sheet 23 is movable along the length of the spacing 29. The sides of the slit-like spacing along the width of the electrode sheet 23 are enclosed. An electrode piling agent is supplied from an external source into the die element pair 25, 27 through supply flow paths 47, 49. Discharge ports 47a, 49a of the supply flow paths 47, 49 are open to the slit-like spacing 29. The portion of the spacing 29 downstream of the discharge ports 47a, 49a in the direction of movement of the electrode sheet 23 has a thickness equivalent to the thickness of the electrode sheet 23 plus the thickness of the electrode piling agent coated on the two sides of the electrode sheet 23. The portion of the spacing 29 upstream of the discharge ports 47a, 49a has a thickness substantially equal to the thickness of the electrode sheet 23. The job of coating the electrode piling agent on the two sides of the electrode sheet can thus be performed with high accuracy.

14 Claims, 20 Drawing Sheets

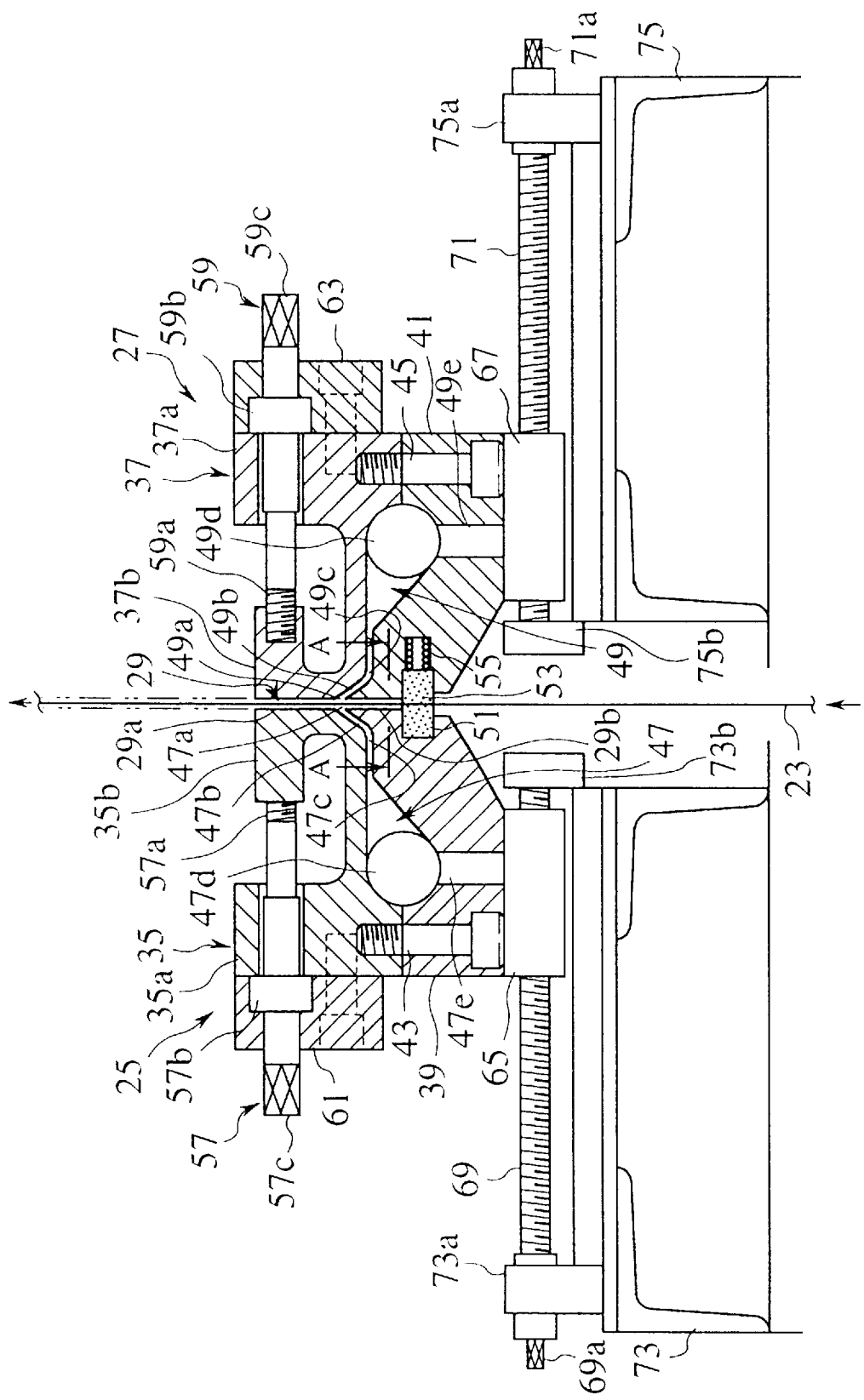

APPARATUS AND METHOD FOR APPLYING A COATING TO A BASE MATERIAL

BACKGROUND OF THE INVENTION

1. Field of the Invention

The present invention relates to a coating die for coating a coating liquid simultaneously on the two sides of a band-shaped base material moving in longitudinal direction. The invention also relates to a coating die capable of forming an intermittent coating layer on the two sides of a base material.

2. Description of the Related Art

A coating die for coating a coating liquid simultaneously on the two sides of a band-shaped base material is disclosed in JP-A-51-137760. This conventional coating die, as shown in FIG. 1, is an apparatus for coating the two sides of an aluminum foil 1 and bonding paper 3 to one of the coating surfaces to produce a cover of the cup for the cup noodle.

When the aluminum 1 is sent out to a pair of cooling rolls 5, a coating hot melt 9 is supplied from a T-die 7, and hot and molten polyethylene or the like molten resin 13 is supplied from a T-die 11. These coating materials are applied to the two sides of the aluminum foil 1, and the paper 3 supplied to the cooling rolls 5 adheres to one side of the aluminum foil 1 through the molten resin, thereby producing a product.

A spacing 15 is formed between the T-dies 7, 11. The air involved when the aluminum foil 1 passes through the spacing 15 is absorbed by fans 17 and discharged outside through pipes 19. The bonding failure of the coating resin thus is prevented. The thickness of the aluminum foil and the hot melt layer is adjusted by moving regulation plates 21 with respect to the aluminum foil 1.

This conventional coating die, although capable of coating the two sides at the same time, has the disadvantage described below since the the hot melt 9 and the molten resin 13 constituting the coating liquid are brought into contact with the aluminum foil 1 constituting the base material in the atmosphere.

(1) The coating liquid is liable to oxidize or otherwise degenerate in contact with the atmosphere before coming into contact with the base material.

(2) The coating pressure is nil and the coating is effected in an open environment. The coating strength is therefore difficult to improve, resulting in a low adherence of the coating film. Especially in the case where a porous, perforated or grooved base material is used, the coating liquid finds its way into the spacing of the base material difficult, thereby making it difficult to improve the production speed.

Another coating die of this type disclosed in JP-A-1-194265 is used for forming an intermittent coating layer on the two sides of a base material sheet in the process for manufacturing the electrode plates of a lithium-manganese secondary cell.

A coating die 300, as shown in FIG. 2, supplies a base material sheet 304 of an aluminum foil from a supply unit 303 with a coating material 302 held in a storage section 301. When the base material sheet 304 is moved along the direction of arrow, shutter members 305, 305 are slid in the direction of X (the position shown in FIG. 2) and then kept stationary for a predetermined length of time. Then, the shutter members 305, 305 are slid in the direction of Y until they come into contact with doctor blades 306, 306, and then kept stationary there for a predetermined length of time. These series of operation are repeated in cycles.

In FIG. 2, reference numeral 307 designates guide members, numeral 308 a dryer, numeral 309 a take-up unit and numeral 310 a turn roller.

With the shutter members 305 slid along the direction of X, the shutter members 305 and the doctor blades 306 are separated from each other, and the coating material 302 from the storage section 302 is coated simultaneously on the two sides of the base material sheet 304. Further, the coating material 302 is scraped off by the doctor blades 306, so that the coating material 302 is coated in a predetermined thickness on each of the two sides of the base material sheet 304.

With the shutter members 305 slid along the direction of Y, on the other hand, the shutter members 305 come into contact with the doctor blades 306, and the coating material 302 is prevented from being supplied from the storage section 301 to the base material sheet 304. Therefore, the coating material 302 is not coated on the base material sheet 304.

As a consequence, in the coating die 300, the base material 304 is moved while the shutter members 305 repeatedly slide along the directions X and Y. It is thus possible to form an intermittent coating layer of the coating material 302 simultaneously and continuously on the two sides of the base material.

Another method of forming an intermittent coating layer is shown FIG. 3.

In this method of forming an intermittent coating layer, an intermittent coating layer of the coating material 302 is coated on the base material sheet 304, one side at a time.

More specifically, a coating die 400 coupled through a transport pipe 321 to a storage section 301 of a coating material 302 is controlled to come into and out of contact with a running base material sheet 304 in accordance with a coating pattern of an intermittent coating layer to be formed. With the approach of the coating die 400 to the base material sheet 304, a coating layer 320 is formed on one side of the base material sheet 304 (FIG. 3A), while a non-coated portion 322 is formed as the coating die 400 comes away from the base material sheet 304 (FIG. 3B). The repetitive cycles of the coating die 400 coming into and out of contact with the base material sheet 304 causes an intermittent coating layer of a desired pattern to be formed on one side of the base material sheet 304. In the process, the coating die 400 supplies the coating material 302 with the approach thereof to the base material sheet 304, while the supply of the coating material 302 is stopped as the coating die 400 comes away from the base material sheet 304. The intermittent coating layer is formed, one side of the base material sheet 304 at a time, by the coating die 400, and hence an intermittent coating layer of the desired coating pattern can be formed on the two sides after all.

Nevertheless, the conventional coating dies 300, 400 have the disadvantages described below.

First, in the coating die 300, with the storage section 301 in open structure, the coating material 302 is liable to degenerate due to oxidization or the like phenomenon before coming into contact with the base material sheet 304. Also, since the coating pressure is zero, the bonding strength of the coating layer cannot be improved, resulting in a deteriorated quality of the coating layer.

With the coating die 300, the shutter members 305 are required to be opened and closed frequently depending on the coating pattern of the intermittent coating layer. The resulting liquid level variations of the coating material 302 is liable to change the thickness of the coating layer. Employing an immersion process allowing the coating material 302 to attach to the base material sheet 304 in natural way, this conventional method has the problem of a deteriorated uniformity and a low surface smoothness of the coating layer, resulting in a film thickness accuracy.

The coating die 400, on the other hand, is used to form an intermittent coating layer on the base material sheet 304, one side at a time. It is difficult, after completing the process of applying a first coating layer 320 on one side, to set a second coating layer 320 on the other side in an accurate relative position with the first coating layer 320. An attempt to accomplish a highly accurate relative positioning increases the cost of the mold.

Another problem of the coating die 400 lies in that when the coating material 302 is stopped from being supplied as the coating die 400 comes away from the base material sheet 304, the coating material 302 causes drips 400a (FIG. 3B), which in turn causes a bulge 320a at the starting end on the occasion of resuming the coating job (FIG. 3C). As a consequence, the thickness of the coating layer 320 undergoes a variation, thereby leading to a deteriorated thickness accuracy.

SUMMARY OF THE INVENTION

The object of the present invention is to provide a coating die for performing the job of applying a coating material on the two sides of a band-shaped base material with high accuracy.

In order to achieve this object, according to a first aspect of the invention, there is provided a coating die comprising a pair of die elements arranged in opposed relation to each other with a slit-like spacing formed therebetween. through which a band-shaped base material is adapted to move along the length thereof. The die element pair has therein a flow path for supplying the coating liquid from an external source. A discharge port of the supply flow path is opened to the slit-like spacing. The portion of the slit-like spacing downstream of the discharge port along the direction of movement of the base material has a thickness equivalent to the sum of the thickness of the base material and the thickness of the coating liquid applied to the two sides thereof. The portion of the slit-like spacing upstream of the discharge port, on the other hand, has a thickness substantially equivalent to the thickness of the base material.

In this configuration, the coating liquid flowing in by way of the supply flow path is supplied through the discharge port open to the spacing and applied without contact with air to the two sides of the base material moving through the slit-like spacing between a pair of coating die elements. For this reason, the oxidization of the coating liquid is avoided, and at the same time the coating pressure can be increased, thereby making possible a highly accurate coating work.

In a second feature of the first aspect of the invention, there is provided a coating die further comprising a pair of side plates with opposed surfaces thereof adapted to closely attach to each other, arranged on the sides of the die element pair on the side edges along the width of the base material thereby to enclose the slit-like spacing on the two sides along the width of the base material.

In this configuration, the portion of the slit-like spacing on the two sides along the width of the base material is enclosed by the side plates, so that the hermeticity of the slit-like spacing is secured, thereby making possible a coating work with higher accuracy.

In a third feature of the first aspect of the invention, there is provided a coating die further comprising at least a seal member disposed at the entrance of the slit-like spacing of the die element pair by way of which the base material enters the spacing, which seal member is in close slidable contact with the two sides of the base material thereby to seal the slit-like spacing.

In this configuration, the entrance of the die element pair by way of which the base material enters the slit-like spacing is sealed, and therefore the coating liquid is prevented from flowing out from the entrance.

In a fourth feature of the first aspect of the invention, there is provided a coating die, in which at least a portion of the supply flow path upstream of the discharge port for supplying the coating liquid is shaped linearly, and this linear portion is located at an angle to the base material so that the discharge port is located downstream of the linear portion in the direction of movement of the base material.

In this configuration, the coating liquid discharged from the discharge port comes into contact with the surface of the base material at a sharp angle from the upstream side along the direction of movement of the base material, and therefore the coating work is smoothly accomplished.

In a fifth feature of the first aspect of the invention, there is provided a coating die, in which at least one of the opposed surfaces of the two die elements forming the slit-like spacing is adapted to come toward and away from the opposed surface of the other die element.

In this configuration, the cleaning of the surfaces of the die element pair forming the slit-like spacing and the setting of the base material are facilitated by widening the slit-like spacing.

In a sixth feature of the first aspect of the invention, there is provided a coating die, in which the portion of the die elements arranged in opposed relation to each other upstream of the discharge port of the supply flow path along the direction of movement of the base material includes a non-coated portion forming member for forming a non-coated portion at predetermined positions along the width of the base material where the supply flow path is closed and the coating liquid is not applied to the base material.

In this configuration, the coating liquid flowing in through the supply flow path toward the base material is blocked by the no-coated portion forming member and is prevented from being applied to the base material at a position corresponding to the non-coated portion forming member, thus constituting a non-coated portion of the base material.

In a seventh feature of the sixth configuration according to the first aspect of the invention, there is provided a coating die, in which the upstream end of the non-coated portion forming member has a guide surface for guiding the coating liquid flowing in through the supply flow path in the direction along the width of the base material.

In this configuration, the coating liquid smoothly flows along the guide surface of the non-coated portion forming member to the sides thereof, and therefore the work of applying the coating liquid on the base material surface is improved.

In an eighth feature of the sixth configuration according to the first aspect of the invention, there is provided a coating die, in which the non-coated portion forming member is removably mounted on the die elements.

In this configuration, the entire surface of the base material may be coated without any non-coated portion by removing the non-coated portion forming member, or the positions of the non-coated portions along the width of the base material can be changed appropriately by changing the position of the non-coated portion forming member, or the base material can otherwise be variously coated.

In a ninth feature of the sixth configuration according to the first aspect of the invention, there is provided a coating die, further comprising a non-coated portion holder arranged at the exit of the slit-like spacing between the die elements by way of which the base material is supplied, which holder is adapted to hold the non-coated portion of the base material formed by the non-coated portion forming member against the two sides of the base material slidably in close contact therewith.

In this configuration, the vibrations of the base material moving through the slit-like spacing can be suppressed by the non-coated portion holder.

In a tenth feature of the ninth configuration according to the first aspect of the invention, there is provided a coating die, in which the non-coated portion holder is rotatable in contact with the base material while the latter is moving.

In this configuration, the non-coated portion holder holds the base material while rotating, and therefore has no adverse effect on and assures smooth movement of the base material.

Another object of the invention is to provide a coating die in which an intermittent coating layer of the desired coating pattern can be formed on each of the two sides of a base material easily and inexpensively, while at the same time permitting the intermittent coating layer to be formed with an improved coating layer quality and thickness accuracy.

In order to achieve this object, according to the second aspect of the present invention, there is provided a coating die comprising a pair of die elements for coating a coating material on each of the two sides of a running base material, which die element pair includes a supply flow path with a discharge port opened at the surface portion thereof corresponding to the surface of the base material to be coated, and a intake flow path with an intake port open at the surface portion thereof adapted to absorb the coating material supplied from the discharge port, or in other words to remove the coating material after it has been supplied from the discharge port, wherein the die elements are controlled to repeatedly advance to and withdraw from the base material independently of each other according to the desired coating pattern to be formed on the two coating surfaces of the base material. At the same time, the supply flow path continues to supply the coating material regardless of the advance or withdrawal of the die elements, and the intake flow path is controlled to start absorbing the coating material when the die elements start withdrawing and to stop the absorption when the die elements stops advancing.

According to the present invention, there is also provided a method of coating a liquid on a band-shaped base metal by a coating die comprising a pair of coating die elements, a supply flow path having a discharge port open at the surface portion thereof corresponding to the coating surface of the band-shaped base material and an intake flow path with an intake port open at the same corresponding portion and capable of absorbing the coating material supplied from the discharge port, wherein the die elements advance to or withdraw from the base material independently of each other on the one hand while at the same time activating or deactivating the operation of supplying or absorbing the coating material on the other hand, according to a coating pattern to be formed on each coating surface of the base material, the method comprising the steps of causing the supply flow path to continue supplying the coating material and causing the intake flow path to start the absorption when the die elements start to withdraw from the advanced position, and causing the supply flow path to continue supplying the coating material and causing the intake flow path to stop absorption when the die elements completes the advancement to the advanced position.

According to this invention, the die elements form a coating layer of the coating material on the base material in a state advanced to the proximity of the base material, and form a non-coated portion of the base material in a state away from the base material. The two die elements repeat the operations of advance to and withdrawal from the base material independently of each other according to a desired coating pattern respectively to be formed on the two sides of the base material. In this way, an intermittent coating layer of the desired coating pattern can be formed at the same time on the two coating sides of a running base material. As a consequence, intermittent coating layers can be formed easily and inexpensively without any need of the work for setting the two coating layers in relative positions to each other.

In the process, the coating material is retained in a hermetic system ready to be discharged from the discharge port of the supply flow path, and therefore the deterioration of the coating material due to oxidization or the like is minimized. At the same time, a coating layer is formed with a sufficient bonding strength under the discharge pressure. The quality of the coating layer thus is improved.

During the period from the start of withdrawal to the completion of advance of the die elements for forming a non-coated portion of the base material, the intake flow path continues to absorb the coating material discharged from the supply flow path. Therefore, the coating material is prevented from dripping or leaking during the period when a non-coated portion is formed, thereby preventing the thickness variations of the recoated layer which otherwise might occur due to the drippings or leakage.

In a coating die of this configuration, the coating material is a battery electrode piling agent, and the base material is a base material sheet for the battery electrodes.

According to this invention, therefore, the deterioration of the electrode piling agent can be suppressed, and an intermittent coating layer of the electrode piling agent having a proper bonding strength and thickness accuracy can be formed continuously at the same time on the two sides of a battery electrode base material sheet.

BRIEF DESCRIPTION OF THE DRAWINGS

FIGS. 3A to 3C show the process for forming an intermittent coating layer using another conventional coating die. in which FIGS. 3A, 3B are diagrams for explaining the steps of forming an intermittent coating layer, and FIG. 3C shows a sectional view of the coating layer thus formed.

FIG. 4 is a sectional view showing a coating die according to an embodiment of the invention.

FIGS. 19A and 19B show a base material sheet having an intermittent coating layer, in which FIG. 19A is a plan view, and FIG. 19B is a sectional view taken in line H—H in FIG. 19A.

DESCRIPTION OF THE PREFERRED EMBODIMENTS

Embodiments of the present invention will be described below with reference to the accompanying drawings. FIG. 4 is a sectional view showing a coating die according to an embodiment of the invention. A band-shaped base material to be coated with a coating liquid using the coating die is a battery electrode sheet with the two sides thereof to be coated with an electrode piling agent and the two side edges thereof forming a non-coated portion not coated with the electrode piling agent. What is meant by piling agent, is a coating with a rough thickness. The electrode sheet used herein is assumed to be the one used for a nickel-hydrogen cell. In the nickel-hydrogen cell, a three-dimensional porous substrate plated with nickel is used as a base material of the positive electrode, and a stainless perforated sheet is used as a base material of the negative electrode. The positive electrode is coated with an electrode piling agent with nickel hydroxide and water as main components, and the negative electrode with an electrode piling agent with a hydrogen-occluded alloy and water as main components. The electrode piling agents thus coated are dried.

Figure 1:
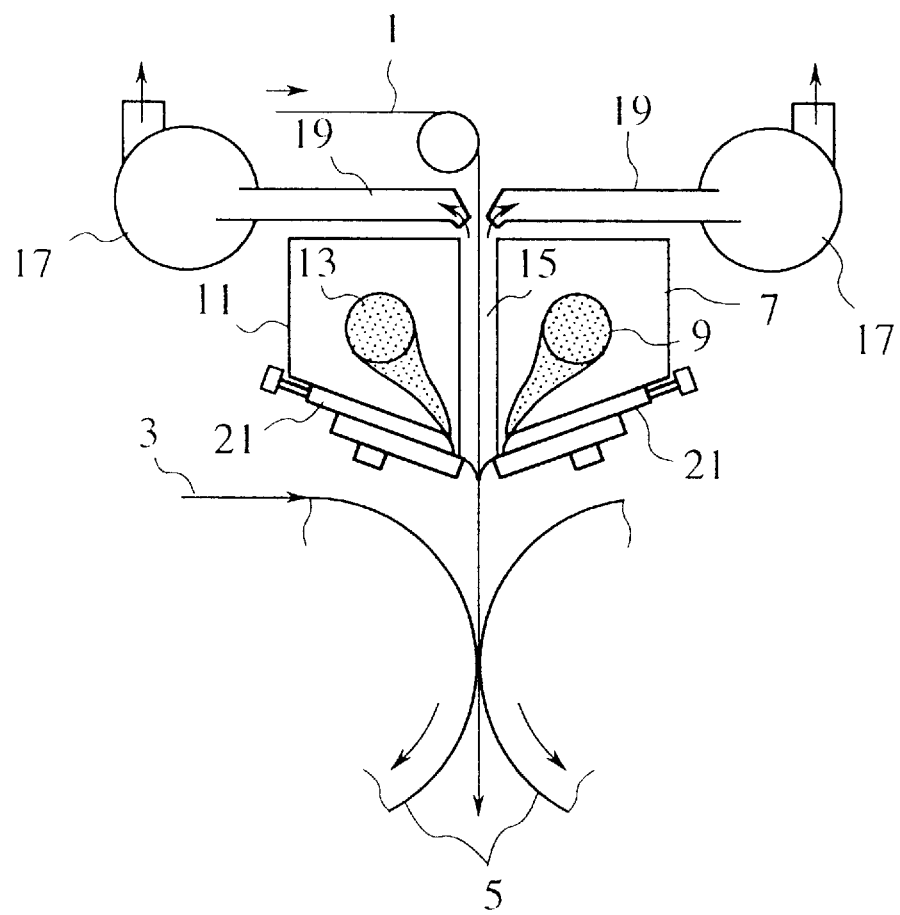
FIG. 1 is a sectional view showing a conventional coating die.
Figure 2:
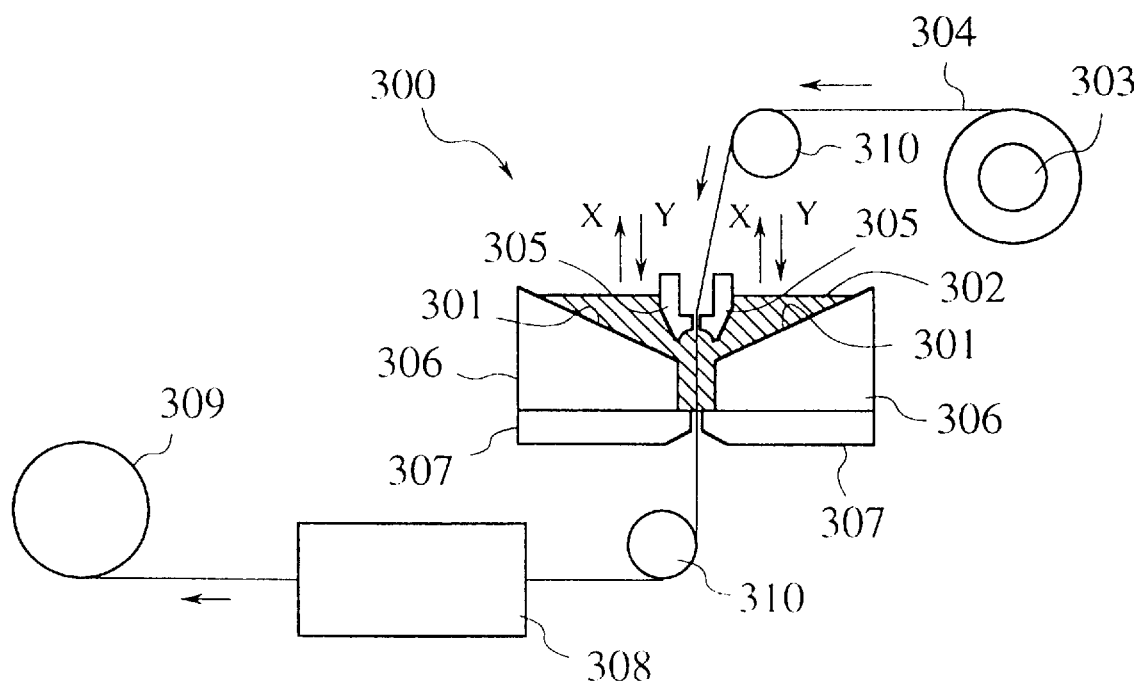
FIG. 2 is a schematic diagram showing the steps of fabricating an intermittent coating layer using a conventional coating die.
Figure 3A:
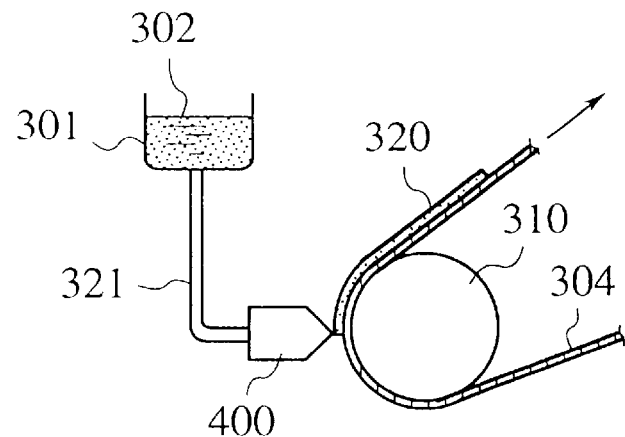
Figure 3B:
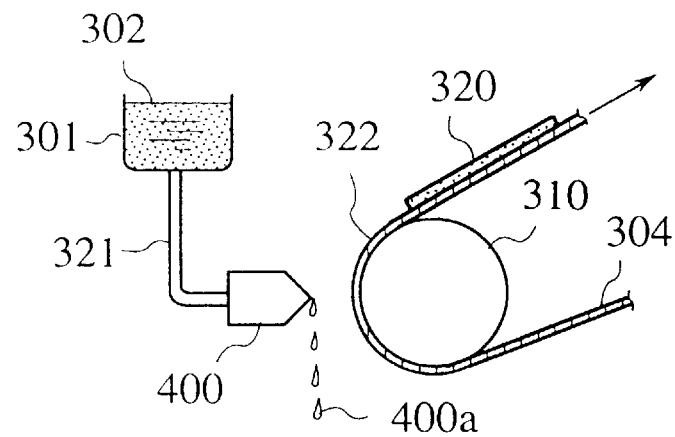
Figure 3C:
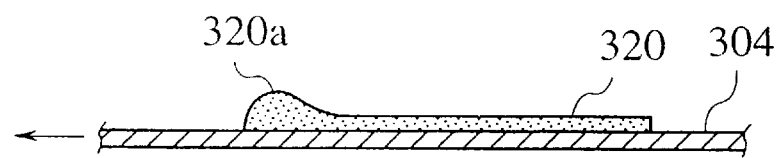
Figure 5:
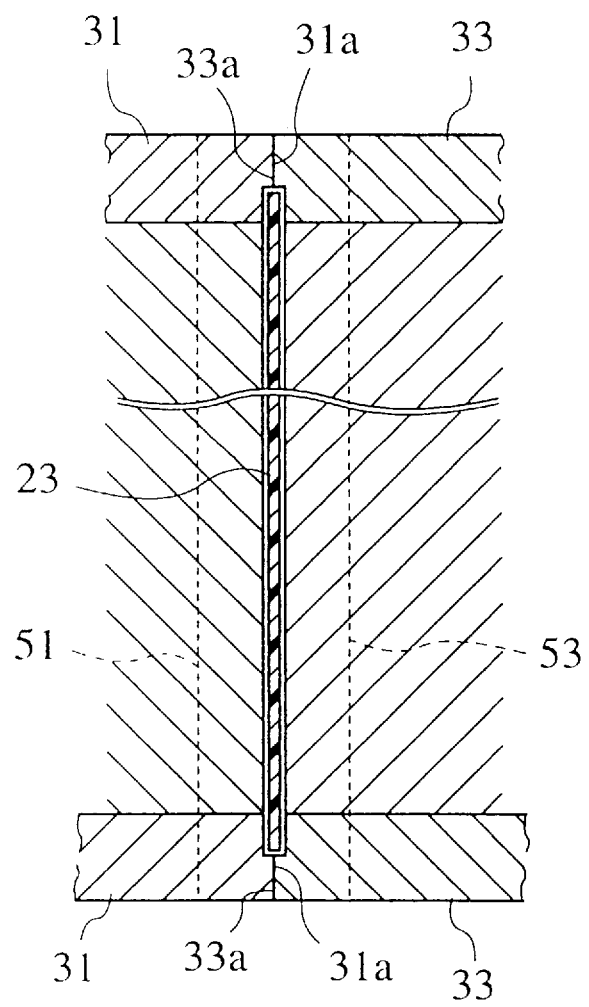
FIG. 5 is a sectional view taken in line A—A in FIG. 4.

The coating die described above comprises a pair of die elements 25, 27 arranged in opposed relation to each other with an electrode sheet 23 interposed therebetween. A slit-like spacing 29 is formed between the die elements 25, 27. The slit-like spacing 29, as shown in the sectional view of FIG. 5 taken in line A—A in FIG. 4, has the two sides thereof along the width (vertical direction in FIG. 5) of the electrode sheet 23 enclosed by side plates 31. 33. Each of the side plates 31, 33 is fixed on each side of the die elements 25, 27 with the mutually-opposed surfaces 31a, 33a thereof closely butted with each other.

The die elements 25, 27 are formed substantially symmetrically, and each include upper blocks 35, 37 and lower blocks 39, 41. The upper blocks 35, 37 and the lower blocks 39, 41 are fixed to each other on the outer side (the side far from the slit-like spacing 29) by bolts 43, 45 respectively. Supply flow paths 47, 49 by way of which an electrode piling agent described above are supplied from an external source are formed between the upper blocks 35, 37 and the lower blocks 39, 41. The supply flow paths 47, 49 have discharge ports 47a, 49a open to the spacing 29. The spacing portion 29a downstream of the discharge ports 47a, 49a (upper part in FIG. 4) which constitutes the downstream side of movement of the electrode sheet 23 has a thickness equivalent to the sum of the thicknesses of the electrode sheet 23 and the electrode piling agents coated on the two sides of the electrode sheet 23. The spacing portion 29b upstream of the discharge ports 47a, 49a (lower side in FIG. 4) providing a spacing on the upstream side of movement of the electrode sheet 23, on the other hand, has a thickness substantially equivalent to the thickness of the electrode sheet 23.

The lower blocks 39, 41 at the lower end of the spacing portion 29b have therein seal members 51, 53 arranged in opposed relation to each other with the electrode sheet 23 interposed therebetween and extended to a position reaching the outer side surface of the side plates 31, 33. The seal member 51 is fixed in the lower block 39, and the other seal member 53 is urged by a spring 55 toward the electrode sheet 23 in the lower block 41. With the seal member 53 urged toward the electrode sheet 23, each seal member 51, 53 is closely attached to the electrode sheet 23, thereby sealing the entrance of the spacing 29 by way of which the electrode sheet 23 is introduced.

The supply flow paths 47, 49 for supplying the electrode piling agent to the spacing 29 have linear portions upstream of the discharge ports 47a, 49a. The linear portions 47b, 49b are set at an angle to the electrode sheet 23 in such a manner that the discharge ports 47a, 49a are located downstream in the direction of movement of the electrode sheet 23. The upstream ends of the linear portions 47b, 49b are formed with bent portions 47c, 49c, respectively. The portions of the supply flow paths 47, 49 upstream of the bent portions 47c, 49c are extended horizontally. The portions of the supply flow paths 47, 49 further upstream of the extension are where the flow path area is expanded upstream, with the upstream end thereof formed with supply ports 47d, 49d, respectively.

The supply ports 47d, 49d are larger in flow path area than the bent portions 47c, 49c or the linear portions 47b, 49b downstream thereof. As a result, these portions constitute what is called a throttle when considering the supply flow paths 47, 49 as a whole. The lower side of the supply ports 47d, 49d communicates with an (upper) end of entrance flow paths 47e, 49e formed in the lower blocks 39, 41. The other end (lower end) of the entrance flow paths 47e, 49e communicates with a path not shown external to the die elements 25, 27 for supplying the electrode piling agent.

The upper blocks 35, 37 have fixed portions 35a, 37a fixed to the lower blocks 39, 41 by bolts 43, 45 and displaced portions 35b, 37b forming the spacing portion 29a. The displaced portions 35b, 37b are connected with the fixed portions 35a, 37a by adjust bolts 57, 59, respectively. The adjust bolts 57, 59 are movable in lateral direction with respect to the fixed portions 35a, 37a. Under this condition, the screw sections 57a, 59a at the forward end of the adjust bolts 57, 59 are forced into the displaced portions 35b, 37b, with heads 57b, 59b located outside the fixed portions 35a, 37a. The adjust bolts 57, 59 are formed with operating sections 57c, 59c extending further laterally from the heads 57b, 59b. The operating sections 57c, 59c are projected from blocks 61, 63 mounted on the fixed portions 35a, 37a in such a manner as to cover the heads 57b, 59b.

When the adjust bolts 57, 59 are rotated through the operating sections 57c, 59c, the displaced portions 35b, 37b are displaced toward or away from each other while being deflected, thereby making it possible to adjust the size of the spacing portion 29a. By adjusting the size of the spacing portion 29a, the thickness of the electrode piling agents coated on the two sides of the electrode sheet 23 is adjusted.

As described above, the die element pair 25, 27 is fixed on the movable blocks 65, 67, into which ball screws 69, 71 extending laterally in FIG. 4 are forced. The ball screws 69, 71 have the ends thereof rotatably supported on mounting brackets 73a, 73b, 75a, 75b on bases 73, 75, respectively. By rotating the operating sections 69a, 71a at the ends of the ball screws 89, 71, the movable blocks 65, 67 are moved toward or away from each other. This movement causes the die elements 25, 27 to displace between a state in which a predetermined spacing 29 is formed for coating the electrode piling agent as shown in FIG. 4 and a state in which the die elements 25, 27 are separated from each other from the state of FIG. 4 and expose the opposed surfaces thereof thereby to allow them to be cleaned or otherwise subjected to the maintenance job.

The operating sections 69a, 71a may be operated either manually or automatically using an air cylinder, a motor or the like.

As described above, in a coating die having the die elements 25, 27, assume that the electrode piling agent is supplied through the entrance flow paths 47e, 49e from an external source while the electrode sheet 23 moves upward at a fixed speed as shown in FIG. 4. The electrode piling agent, after flowing in by way of the supply ports 47d, 49d, is discharged through the supply flow paths 47, 49 from the discharge ports 47a, 49a into the spacing 29. The electrode piling agent thus discharged is sequentially coated on the two sides of the electrode sheet 23 as the latter moves upward. The thickness by which the electrode piling agent is thus coated is determined by the width of the spacing portion 29a.

This coating job is performed in an enclosed system between the opposed surfaces of the die element pair 25, 27, during which the electrode piling agent is kept out of contact with air. The electrode piling agent, therefore, is prevented from degenerating due to oxidization or the like, and the coating pressure is improved. In addition, the linear portions 47b, 49b of the supply flow paths 47, 49 are formed at an angle to the electrode sheet 23 so that the electrode piling agent is discharged obliquely forward in the direction of movement of the electrode sheet 23 from the discharge ports 47a, 49a. Thus, the coating job can be performed smoothly thereby permitting a highly accurate coating. Also, the lower part of the spacing 29 into which the electrode piling agent is discharged is sealed by the seal members 51, 53, and the two sides along the width of the electrode sheet 23 are sealed by the side plates 31, 33. Therefore, the electrode piling agent is prevented from leaking out from downward or sideway.

In the case where it is desired to adjust the coating thickness of the electrode piling agent applied on the electrode sheet 23, the operating sections 57c, 59c of the adjust bolts 57, 59 are rotated. Then the width of the spacing portion 29a changes, thereby facilitating adjustment of the coating thickness. Also, when the die elements 25, 27 are separated from each other and thus the spacing 29 is widened by rotating the operating sections 69a, 71a of the ball screws 69, 71, the opposed surfaces of the die elements 25, 27 are exposed and can be easily cleaned. while at the same time facilitating the job of setting the electrode sheet 23 between the die elements 25, 27.

Although the two die elements 25, 27 are movable toward or away from each other in the above-mentioned embodiment, only one of the die elements 25, 27 may be movable with equal effect.

Figure 6:
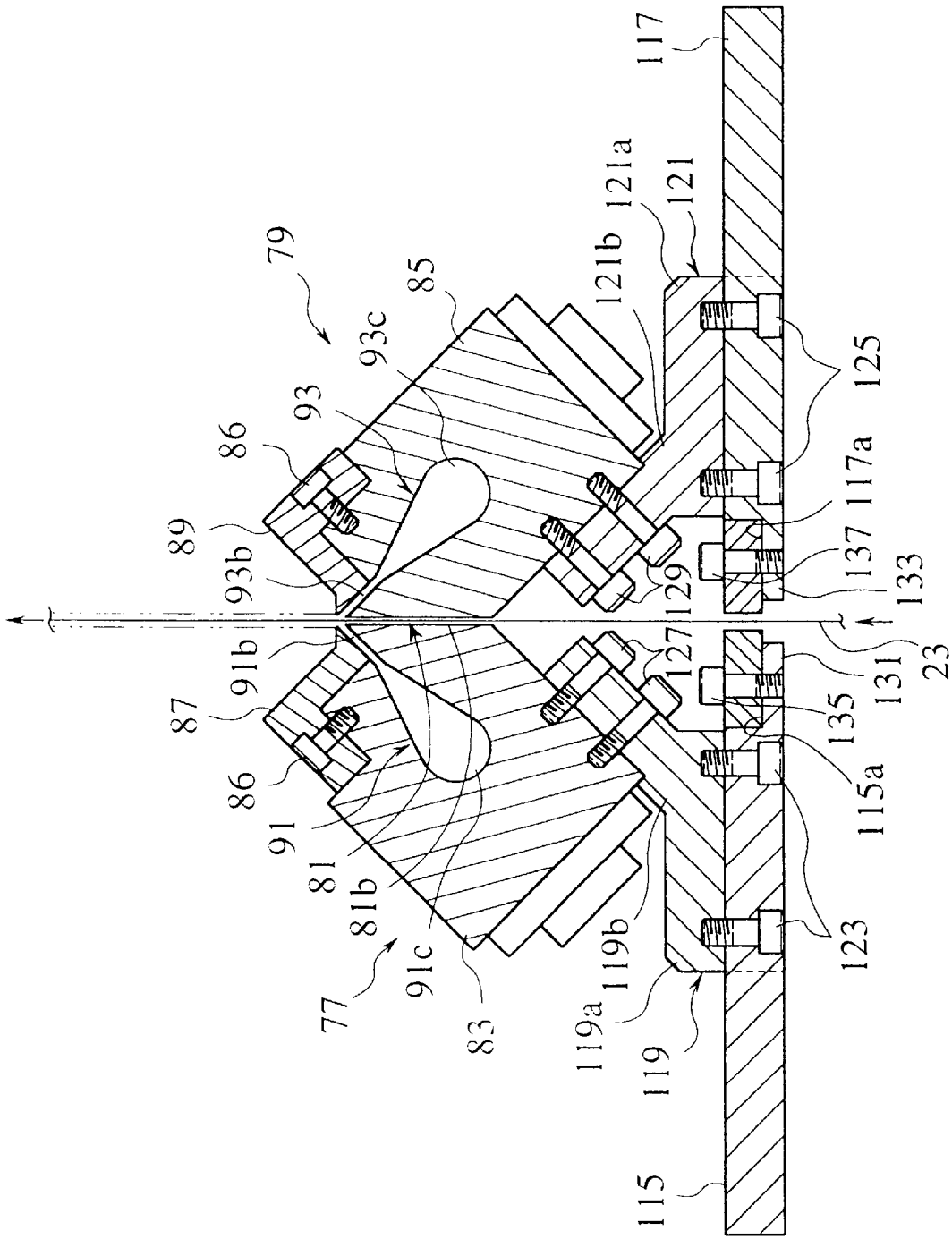
FIG. 6 is a sectional view showing a coating die according to another embodiment of the invention.
Figure 7:
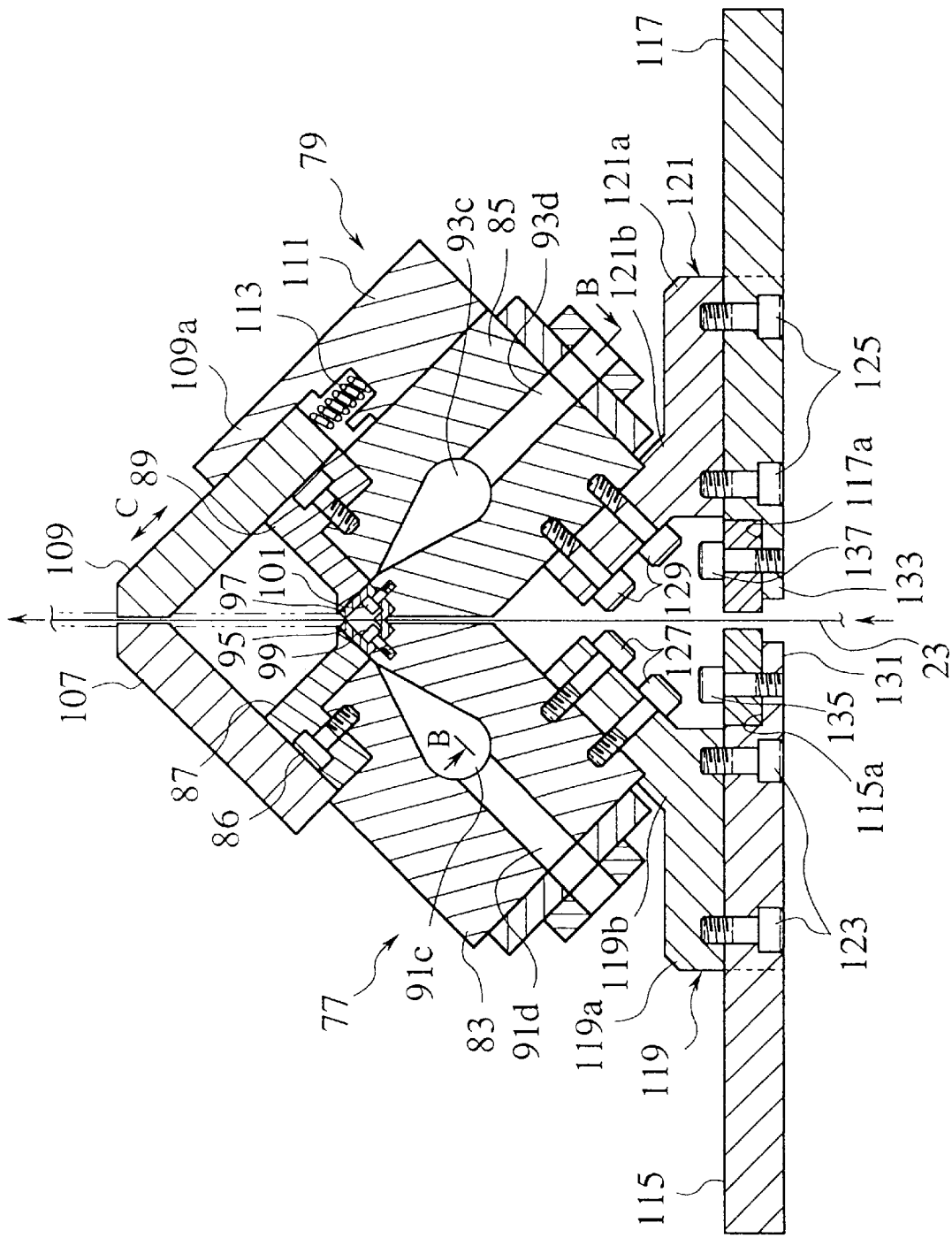
FIG. 7 is a sectional view taken in another part of the coating die of FIG. 6.

FIGS. 6 and 7 are sectional views of a coating die according to another embodiment of the invention. In this embodiment, the electrode sheet 23 has three non-coated portions along the width thereof (two side edges and center) where the electrode piling agent is not coated as the electrode sheet 23 moves in a predetermined direction. The non-coated portions expose the nickel plating for the positive electrode sheet of the nickel-hydrogen cell, and the stainless steel sheet for the negative electrode sheet of the same cell. When a cell is assembled, the electrode sheet 23 is cut by appropriate length along the non-coated portions into electrode plates, and the non-coated portions are used as electrode terminals. FIG. 6 is a sectional view of the dye portion for forming the coated portion, FIG. 7 a sectional view of the dye portion for forming the non-coated portions, and FIGS. 8, 9 enlarged sectional views of the essential parts of FIGS. 6, 7, respectively.

The coating die shown in FIGS. 6, 7, like the one shown in FIG. 4, has a pair of die elements 77, 79 arranged in opposed relation to each other. In the present example, the die elements 77, 79 are inclined at 45 degrees, and a slit-like spacing 81 extending vertically in FIG. 6 is formed between the die elements 77, 79. The die elements 77, 79 have die bodies 83, 85 and auxiliary dies 87, 89 fixed by bolts 86 above the die bodies 83, 85. Supply flow paths 91, 93 by way of which an electrode piling agent is supplied from an external source are formed between the die bodies 83, 85 and the auxiliary dies 87, 89 and within the die bodies 83, 85.

Figure 8:
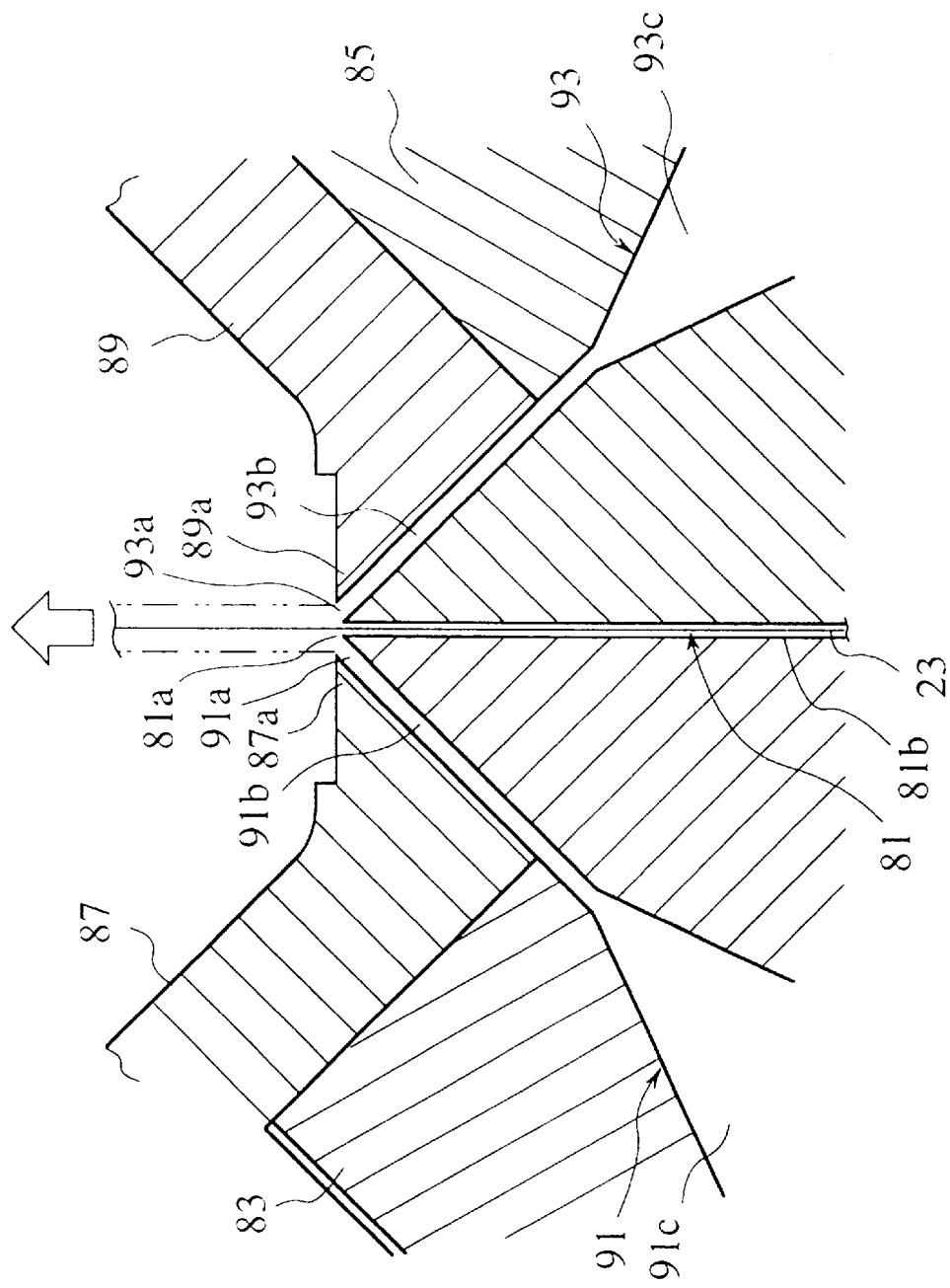
FIG. 8 is a sectional view showing the essential parts of FIG. 6 in enlarged form.

As shown in FIG. 8, the discharge ports 91a, 93a of the supply flow paths 91, 93 are open to the spacing 81. The spacing portion 81a downstream of the discharge ports 91a, 93a (upper portion in FIG. 8) along the direction of movement of the electrode sheet 23 is formed between lips 87a, 89a at the forward ends of the auxiliary dies 87, 89. The distance between the lips 87a, 89a is equivalent to the thickness of the electrode sheet 23 plus the thickness of the electrode piling agents applied on the two sides of the electrode sheet 23. The spacing portion 81b upstream of the discharge ports 91a, 93a (lower portion in FIG. 4) along the direction of movement of the electrode sheet 23, on the other hand, is formed between the die bodies 83, 85. The distance between the die bodies 83, 85 is substantially equivalent to a size somewhat greater than the thickness of the electrode sheet 23.

Figure 10:
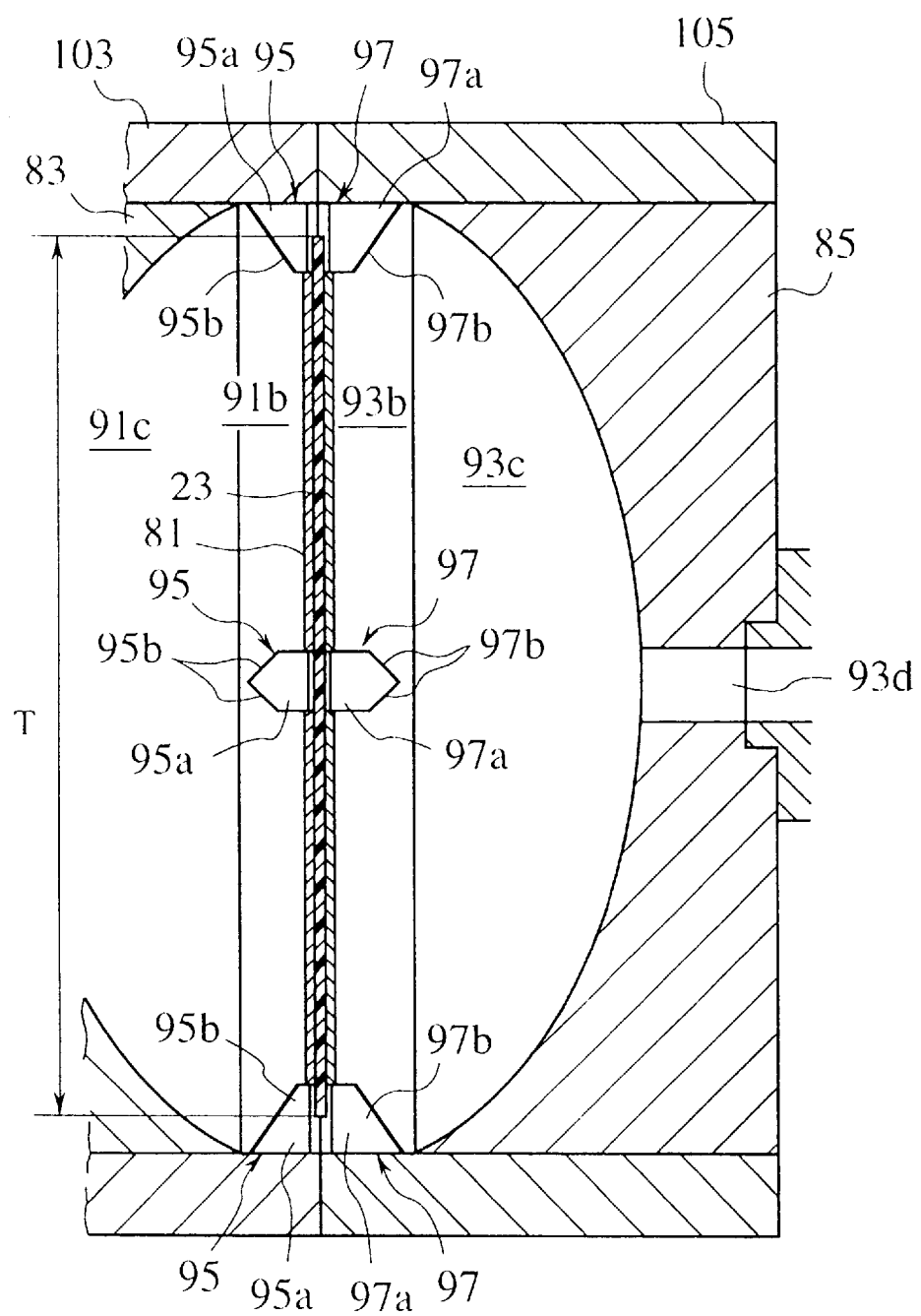
FIG. 10 is a sectional view taken in line B—B in FIG. 7.

The supply flow paths 91, 93 by way of which the electrode piling agent is supplied into the spacing 81 have linearly portions upstream of the discharge ports 91a, 93a. The linear portions 91b, 93b are formed at an angle of 45 degrees to the electrode sheet 23 in conformance with the angle of 45 degrees to which the die elements 77, 79 are set as described above. Supply ports 91c, 93c having a progressively wider area upstream are formed upstream of the linear portions 91b, 93b of the supply flow paths 91, 93. The supply ports 91c, 93c, as shown in FIG. 10 which is a sectional view taken in line B—B of FIG. 7, are formed in an arc having its center at the center along the width of the electrode sheet 23 on the side of the discharge ports 91a, 93a. The upstream ends of the supply ports 91c, 93c at the center along the width of the electrode sheet 23 communicate with an end (upper end) of entrance flow paths 91d, 93d, as shown in FIG. 7. The other end (lower end) of the entrance flow paths 91d, 93d, on the other hand, communicate with a path not shown by way of which the electrode piling agent is supplied from an external source to the die elements 77, 79.

Figure 9:
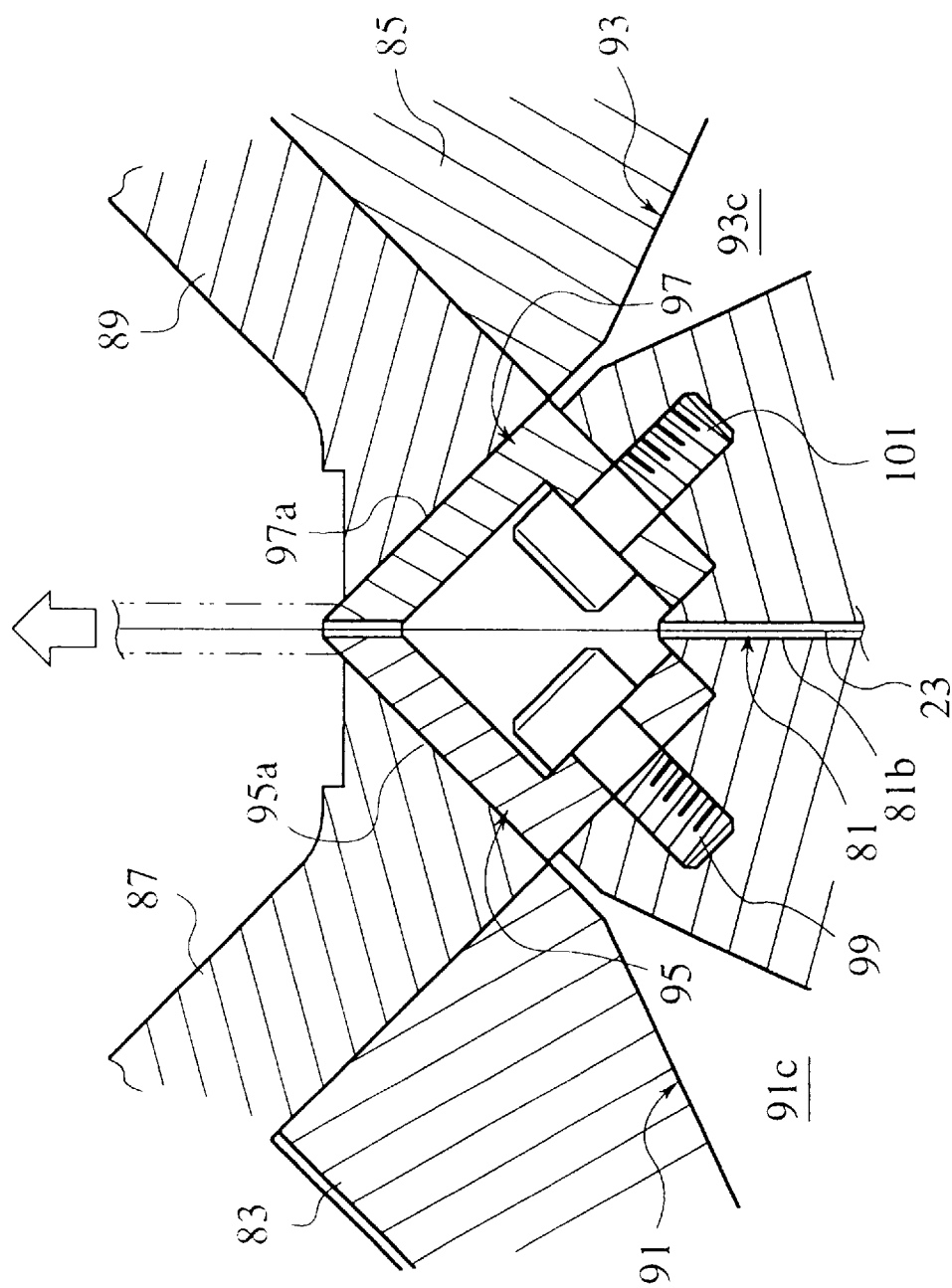
FIG. 9 is a sectional view showing the essential parts of FIG. 7 in enlarged form.

The linear portions 91b, 93b of the supply flow paths 91, 93, as shown in FIG. 10, have three members 95, 97 each as a non-coated portion forming member for enclosing the supply flow paths 91, 93 at the side edges and the center along the width (T) of the electrode sheet 23. The members 95, 97 at the ends along the width T of the electrode sheet 23 are arranged in a position somewhat outward of the width T. The three members each of 95, 97, as shown in FIGS. 7 and 9, are removably fixed on the die bodies 83, 85 by bolts 99, 101, respectively. The surfaces 95a, 97a of the three members 95, 97 on side of the auxiliary dies 87, 89 are closely attached to the auxiliary dies 87, 89. At the same time, as shown in FIG. 10, the end surfaces 95b, 97b of the members 95, 97 on the side of the supply ports 91c, 93c are inclined and constitute a guide surface in order to guide the electrode piling agent sideway (in vertical direction in FIG. 10) along the width of the electrode sheet 23 with respect to the members 95, 97.

Figure 11:
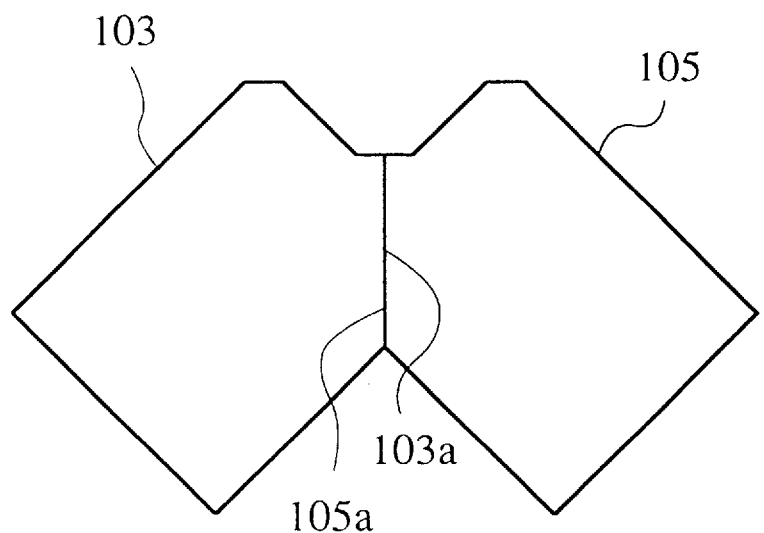
FIG. 11 is a front view showing side plates of the coating die of FIG. 6.

Side plates 103, 105 are fixed, as shown in FIG. 11, on the sides of the die bodies 83, 85 and the auxiliary dies 87, 89 (the sides perpendicular to the page in FIGS. 6 and 7). The opposed surfaces 103a, 105a of the side plates 103, 105 are closely attached to each other and thus secure the hermeticity the sides along the width of the electrode sheet 23 against the spacing 81.

Figure 12:
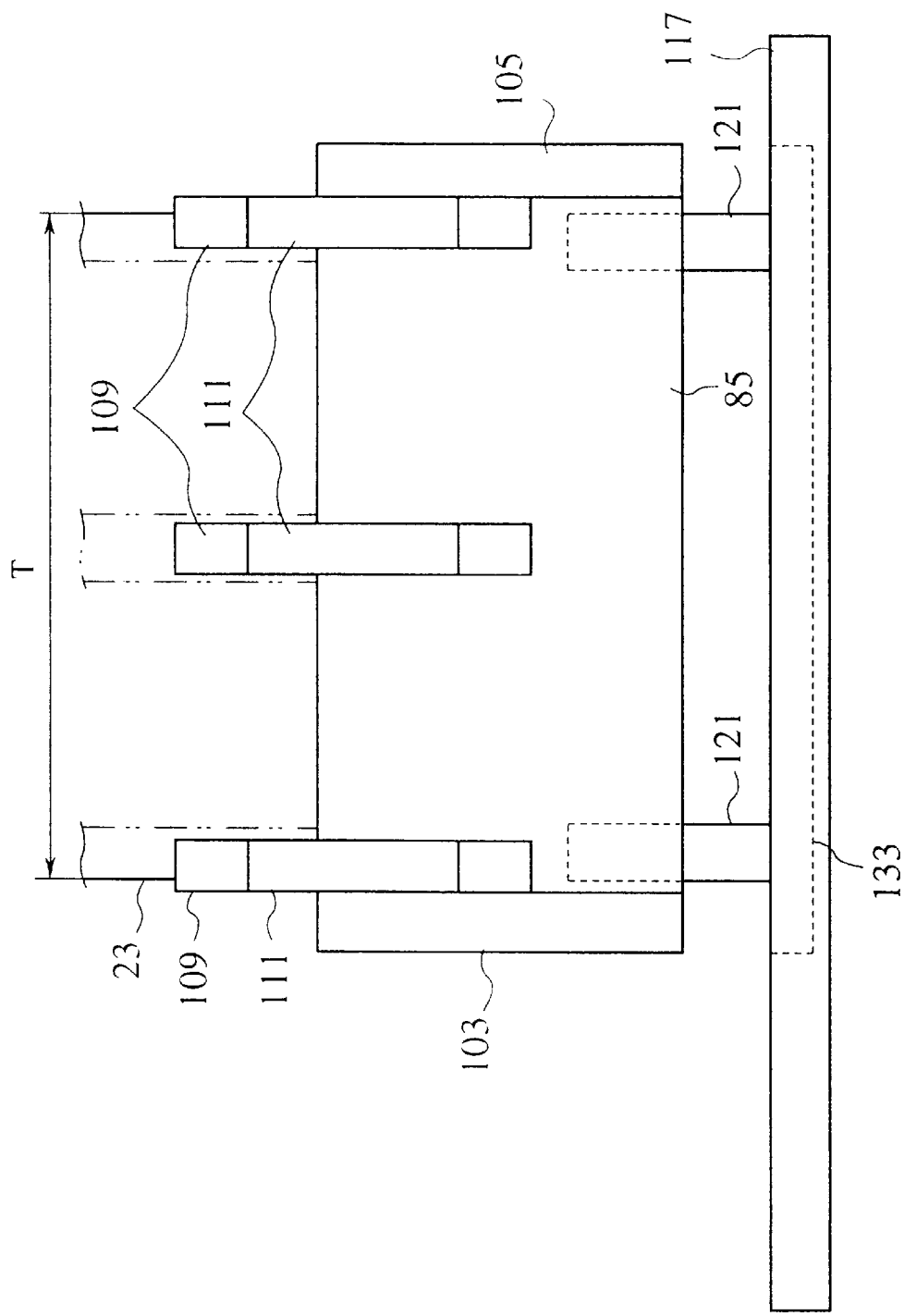
FIG. 12 is a right side view showing the coating die of FIG. 6.

As shown in FIG. 7, the auxiliary dies 87, 89 have mounted thereon non-coated portion holders 107, 109 configured of the members 95, 97. The non-coated portions of the electrode sheet 23 are held from the sides thereof by the forward ends of the non-coated portion holders 107, 109. FIG. 12 is the right side view in FIGS. 6 and 7 and shows the state in which the non-coated portion holder 109 is arranged at three points including the center and the side edges along the width (T) of the electrode sheet 23. The side-edge non-coated portion holders 107, 109, like the members 95, 97, are arranged somewhat outward from the side edges of the electrode sheet 23. Each of the three non-coated portion holders 107, 109, however, is formed smaller than the width of the members 95, 97 thereby to secure only the non-coated portions positively.

The non-coated portion holder 107 is fixed on the auxiliary die 87, while the non-coated portion holder 109 shown in FIG. 12 is movable in the direction of arrow C in FIG. 7 along the inclined surface of the auxiliary die 89. The die body 85 fixed with the auxiliary die 89 has fixed thereon a support member 111. The end of the support member 111 near to the electrode sheet 23 is formed in such a manner as to cover the upper surface of the non-coated portion holder 109. The non-coated portion holder 109 is supported and slides along the direction of arrow C between the cover 109a and the auxiliary die 89. A spring 113 is arranged between the rear end surface of the non-coated portion holder 109 and the support member 111. The non-coated portion holder 109 is urged toward the forward end thereof by the spring 113 thereby to support the electrode sheet 23 slidably between the non-coated portion holder 109 and the forward end surface of the non-coated portion holder 107.

The die elements 77, 79 described above are fixed respectively on the support blocks 119, 121 fixed at two points at the ends along the width of the electrode sheet 23 on the bases 115, 117. The support blocks 119, 121 include bottoms 119a, 121a fixed on the bases 115, 117 by bolts 123, 125, and support members 119b, 121b extended diagonally upward along the inclination of the die elements 77, 79 from the bottoms 119a, 121a and fixed by bolts 127, 129 to the die bodies 83, 85.

The upper surfaces of the opposed ends of the bases 115, 117 are formed with recesses 115a, 117a, to which substrate holders 131, 133 are fixed by bolts 135, 137. The substrate holders 131, 133 are for holding the sides of the electrode sheet 23 to such an extent as not to affect the upward movement thereof, and have a width larger than that of the electrode sheet 23 to hold the electrode sheet 23 by the entire width thereof.

In a coating die having the die elements 83, 85 described above, an electrode piling agent is supplied through the entrance flow paths 91d, 93d from an external source while the electrode sheet 23 moves upward at a fixed rate. The electrode piling agent thus supplied flows in by way of the supply ports 91c, 93c, and is discharged from the discharge ports 91a, 93a through the linear portions 91b, 93b into the spacing portion 81a between the lips 87a, 89a. The electrode piling agent thus discharged is coated on the sides of the electrode sheet 23 as the latter moves upward. The coating thickness of the electrode piling agent is determined by the width of the spacing portion 81a.

In this coating process, since the linear portions 91b, 93b are enclosed by the non-coated portion forming members 95, 97, the side edges and the center of the electrode sheet 23, are not coated with the electrode piling agent. In this way, what is called the non-coated portions are formed at three points, i.e., the side edges and the center, along the width of the electrode sheet 23 corresponding to the non-coated members 95, 97, where the electrode piling agent is not coated. While the non-coated portions are being formed, the electrode piling agent is guided toward the coated portion on the sides of the non-coated portion forming members 95, 97 along the inclined surfaces 95b, 97b thereof. A superior coating job is thus accomplished.

The non-coated portion forming members 95, 97 described above are removably mounted on the die elements 83, 85. By removing the members 95, 97, therefore, the coating over the entire width is made possible as with the coating job using the coating die shown in FIG. 4. Without removing the members 95, 97, as an alternative, the mounting positions of the non-coated portion forming members 95, 97 may be changed appropriately to meet various coating pattern requirements.

In conducting the coating work, the electrode sheet 23 is moved upward in FIGS. 6 and 7. In the process, the downstream side of the electrode sheet 23 is held by the non-coated portion holders 107, 109. and the upstream side thereof by the substrate holders 131, 133. The electrode sheet 23 thus is prevented from vibrating while running. The electrode sheet 23 is maintained in stable state during the coating work, thereby making possible highly accurate coating work.

Figure 13A:
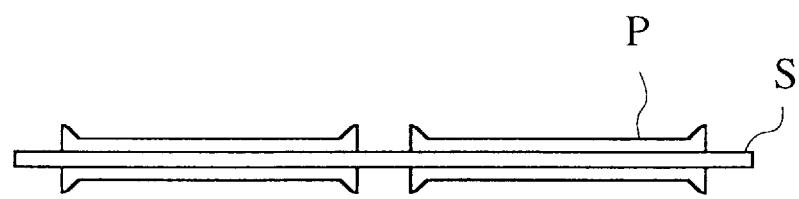
FIG. 13A is a sectional view showing an electrode sheet with a non-coated portion formed according to the prior art.

Conventionally, the work of forming the non-coated portions is performed by first coating the electrode piling agent over the entire width of the electrode sheet and then scraping off the electrode piling agent of the non-coated portion by at least a blade arranged at a predetermined position along the width thereof. In this case, since the electrode piling agent is scraped off from the surface once coated, the electrode piling agent scraped off cannot find their way out. As a result, as shown in FIG. 13A, the side edges along the width of the coating surface P of the electrode sheet S are undesirably projected above the surface for a deteriorated thickness accuracy. Also, in the conventional method of scraping off the electrode piling agent, blades are pressed against the sides of the electrode sheet. This often results in the breakage of a comparatively weak base material. In addition, the blades may be caught in a joint, if any, of the base metal.

Figure 13B:
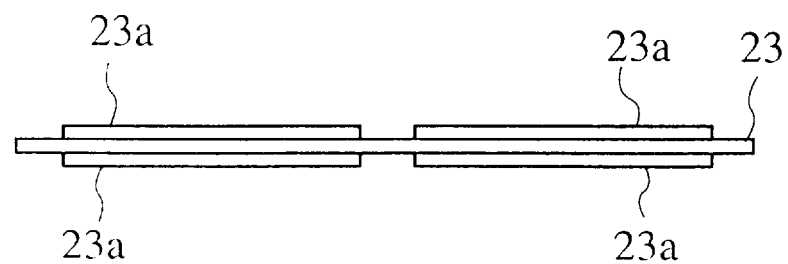
FIG. 13B is a sectional view showing an electrode sheet formed with a non-coated portion by the coating die of FIG. 6.

As compared with the conventional method described above, in the case where the non-coated portions are formed by using a coating die as shown in FIGS. 6 to 12, the non-coated portion forming members 95, 97 are used to keep off the electrode piling agent from the very beginning without employing the scraping system. As shown in FIG. 13B, therefore, the electrode piling agent assumes a flat surface on both of the coated layers 23a. Thus, a high thickness accuracy of the coating film can be maintained, while at the same time preventing the electrode sheet 23 from being broken or caught in a joint which it may encounter.

The coating work described above is performed in an enclosed system as with the coating die shown in FIG. 4. The oxidization of the electrode piling agent thus is prevented, and the coating pressure can be increased. Also, the coating work can be accomplished smoothly with high accuracy, since the linear portions 91b, 93b are formed at an angle to the electrode sheet 23 so that the electrode piling agent is discharged diagonally forward of the direction in which the electrode sheet 23 moves.

Figure 14:
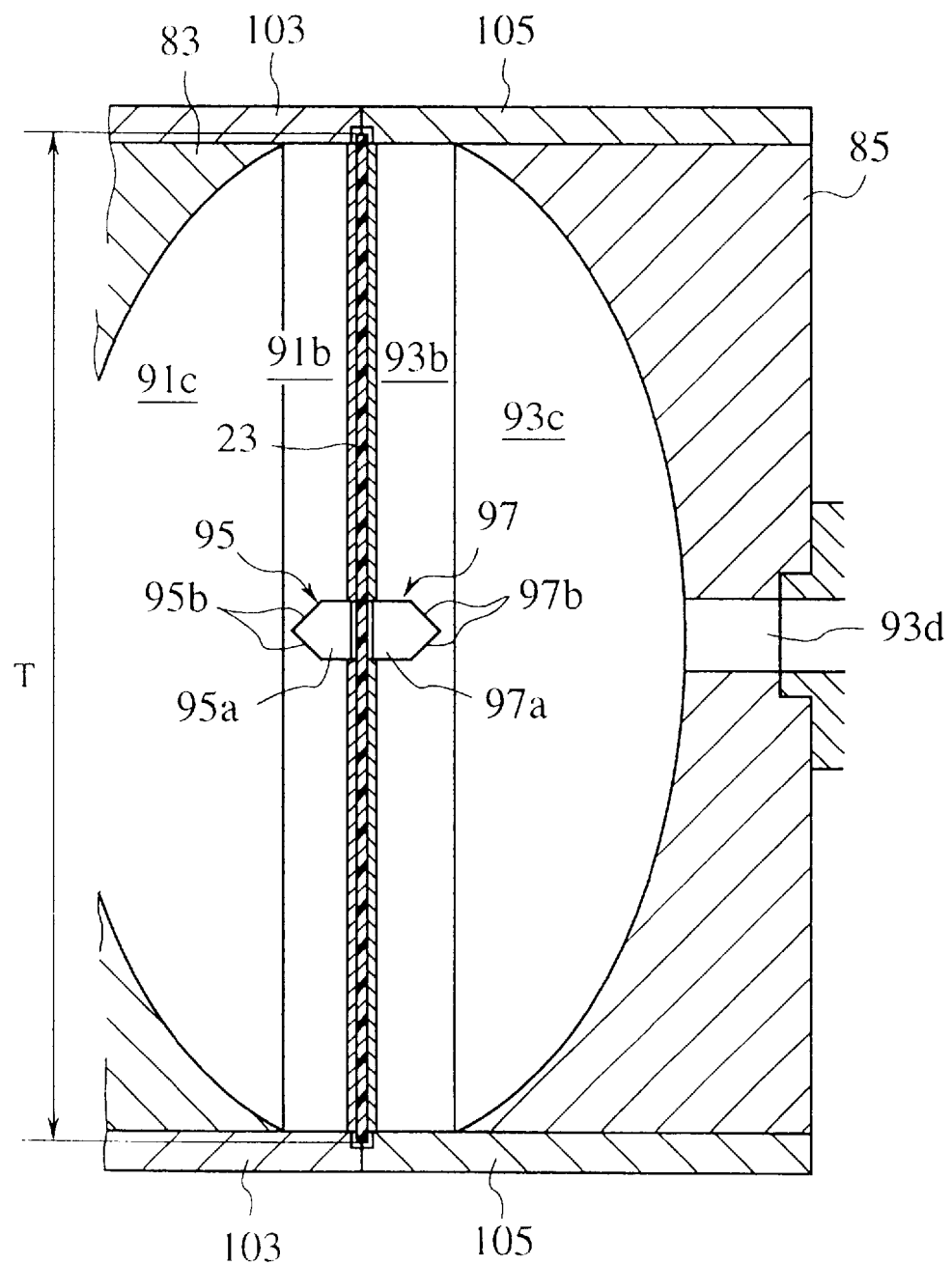
FIG. 14 is a sectional view corresponding to FIG. 10 in the absence of the plain pieces at the two side edges along the width of the electrode sheet.

In FIG. 14, the non-coated portion forming members 95, 97 are formed only at the center but not at the side edges along the width of the electrode sheet 23, and the non-coated portions are formed at three points including the side edges and the center. In this case, the width (along vertical direction in FIG. 14) of the die elements 77, 79 is made smaller than the width T of the electrode sheet 23, and the side edges along the width of the electrode sheet 23 are projected from the side edges of the die elements 77, 79. The projected portions and the center are not coated. The side plates 103, 105 are arranged with the opposed surfaces thereof holding the non-coated portions of the side edges of the electrode sheet 23 therebetween. The electrode sheet 23 thus is pressed from the two sides thereby to seal the sides along the width thereof to an extent not to affect the smooth movement thereof.

The forward ends of the non-coated portion holders 107, 109 for holding the non-coated portion of the electrode sheet 23 according to the invention shown in FIGS. 6 to 12 may be configured of a rotative member like a roller or a roll adapted to rotate while holding the electrode sheet 23. In this way, the tension is hardly affected during the movement of the electrode sheet 23 and the coating work is improved. At the same time, a joint which may be present in the electrode sheet 23 can be smoothly passed.

Now, another embodiment of the invention is described below specifically.

Figure 15:
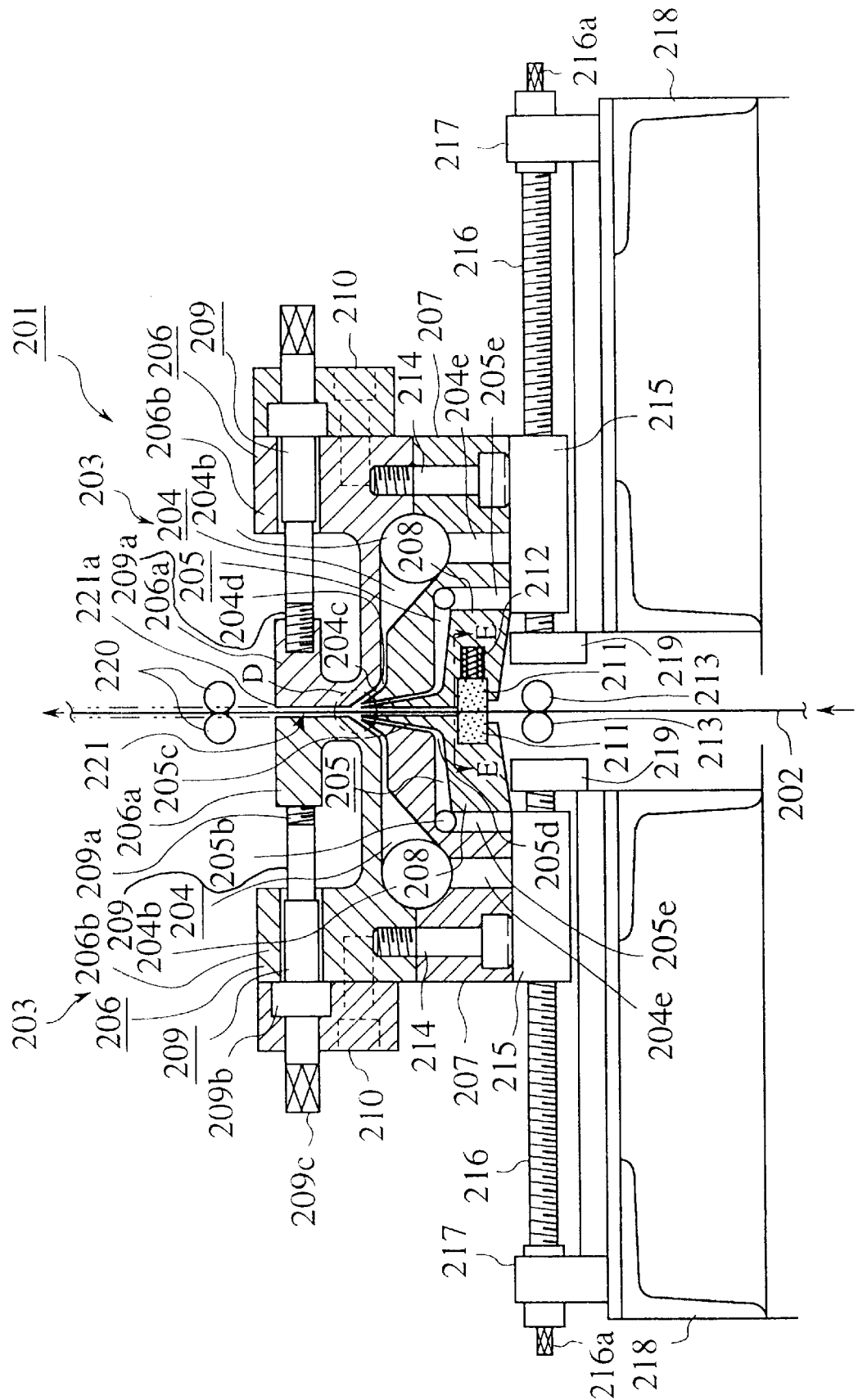
FIG. 15 is sectional view showing a coating die according to still another embodiment of the invention.
Figure 16:
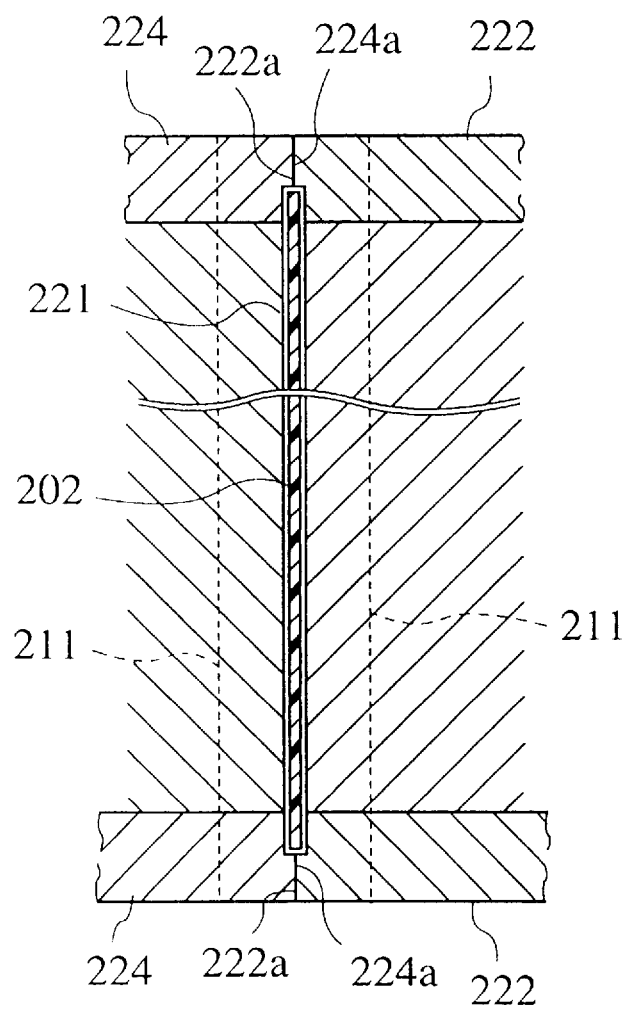
FIG. 16 is a sectional view taken in line E—E in FIG. 15.
Figure 17:
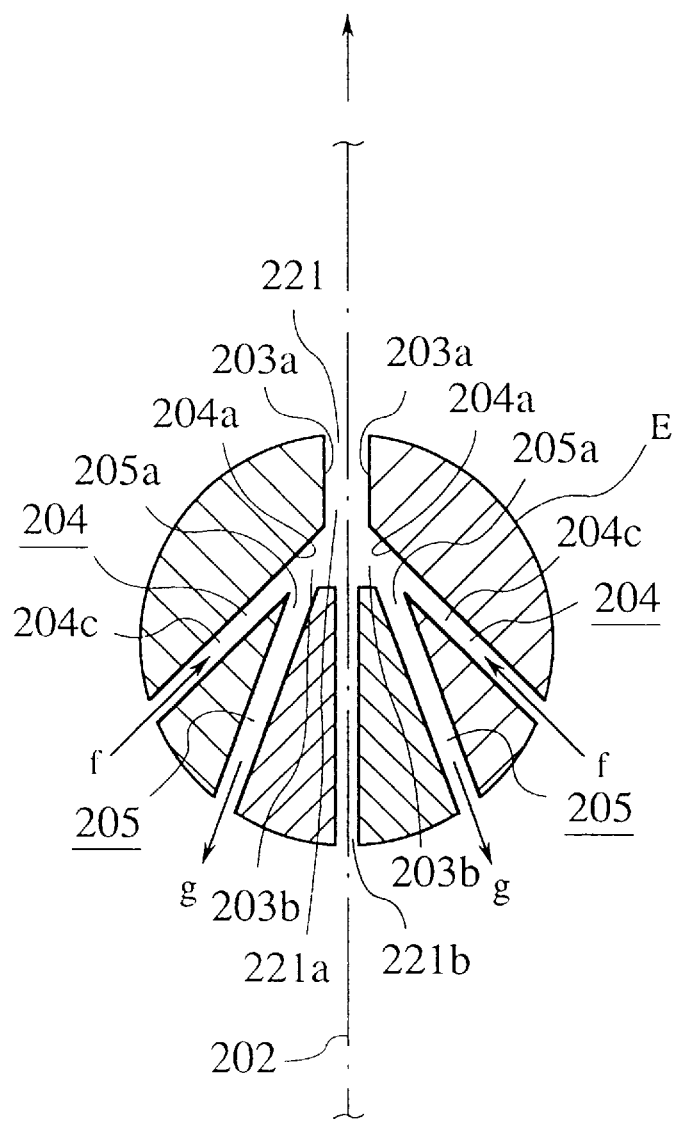
FIG. 17 is a sectional view showing the portion D of FIG. 15 in enlarged form.

FIGS. 15 to 17 show a coating die 201 used for fabricating a battery electrode plate according to another embodiment.

The coating die 201 comprises a pair of die elements 203, 203 including supply flow paths 204 for supplying an electrode piling agent as a coating material and intake flow paths 205 for absorbing, in the sense that the coating material is withdrawn through the intake flow paths, the electrode piling agent supplied from the supply flow paths 204. The die elements 203, 203 are independently controlled to repeat the process of advance to and withdrawal from an electrode sheet 202 as a base material in accordance with a coating pattern of the electrode piling agent to be formed on the sides of the electrode sheet 202. Regardless of whether the die elements 203, 203 advance or withdraw, the supply flow paths 204 continue to supply the electrode piling agent. The intake flow paths 205, on the other hand, are controlled to start absorption of the electrode piling agent when the die elements 203 start withdrawal, and stops absorption when the die elements 203 complete the advance.

Figure 18:
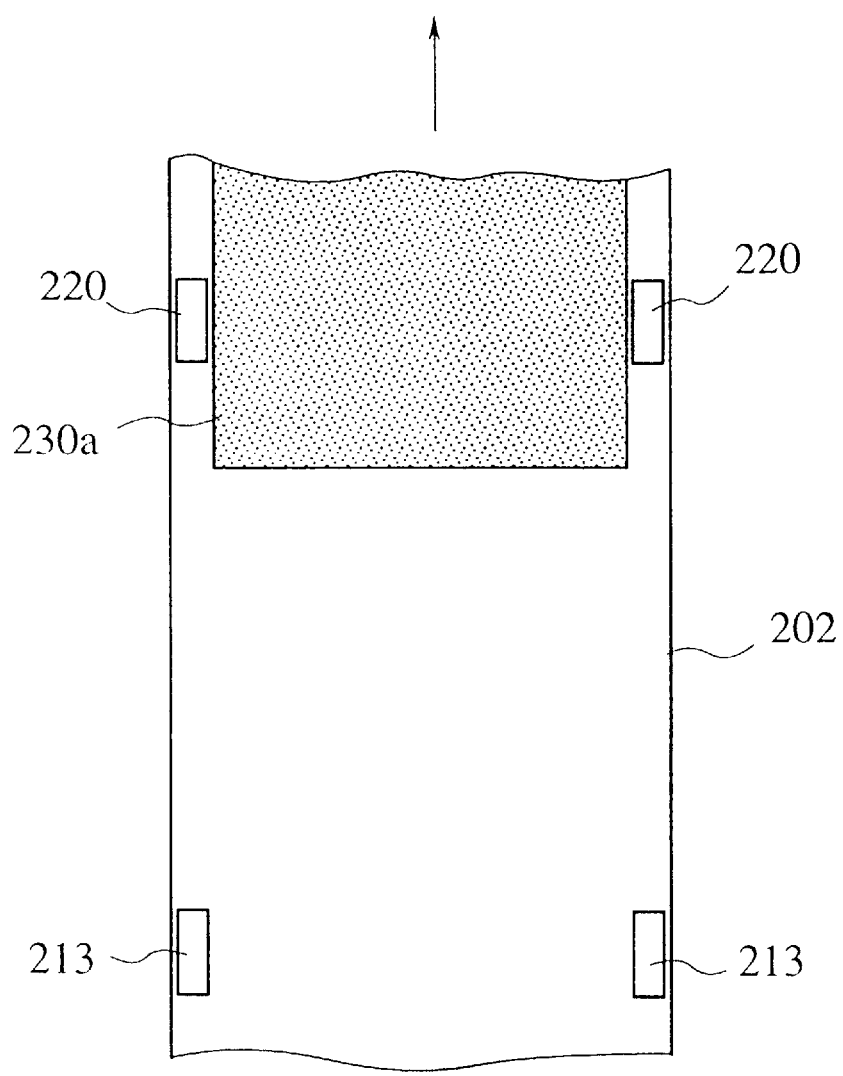
FIG. 18 is a diagram for explaining a roller incorporated in the coating die for supporting the base material sheet.

More specifically, the coating die 201 comprises a pair of die elements 203, 203 arranged in opposed relation to each other on the right and left sides with the electrode sheet 202 held therebetween. A slit-like spacing 221 is formed between the die elements 203, 203. The slit-like spacing 221, as shown in FIG. 16, has the sides thereof along the width of the electrode sheet 202 (vertical direction in FIG. 16) enclosed by side plates 222, 224. The side plates 222, 224 are fixed on the sides of the die elements 203, 203, respectively, and the opposed surfaces 222a, 224a thereof are closely butted against each other. The electrode sheet 202 is supported by an upper roller 220 and a lower roller 213 in proximity to the die elements 203, 203, and restricted to vertical position at the intermediate portion of the slit-like spacing 221, thereby restricting the vibrations of the electrode sheet 202 at the time of coating the electrode piling agent. The upper roller 220 and the lower roller 213, as shown in FIG. 18, are arranged to hold the side edges of the electrode sheet 202 not formed with the coating layer 230a of the electrode piling agent.

The die elements 203, 203 are formed substantially laterally symmetrically, and each includes an upper block 206, a middle block 207 and a lower block 208. The upper block 206 and the middle block 207 are fixed from outside (from the side far from the slit-like spacing 221) by a bolt 214. A supply flow paths 204 is formed between each upper block 206 and each middle block 207 for supplying the electrode piling agent from an external source. The middle block 207 and the lower block 208 are fixedly bolted at an appropriate position thereof (not shown). An intake flow path connected to an external intake pump (not shown) is interposed between each of the middle blocks 207 and each of the lower blocks 208. The intake pump is used to suction the coating agent from the slit like spacing between the die elements through the intake flow paths.

The supply flow paths 204 are arranged to communicate with the slit-like spacing 221 by the discharge ports 204a opened to the recesses 203b of the corresponding surfaces 203a of the die elements 203 opposed to the coating surfaces of the electrode sheet 202. The intake flow paths 205, on the other hand, are formed in such a manner as to communicate with the slit-like spacing 221 by way of the intake ports 205a opened to the recesses 203b of the corresponding surfaces 203a in proximity to the discharge ports 204a (FIG. 17). The discharge ports 204a are arranged downstream of the intake ports 205a along the direction of progress of the electrode sheet 202 (indicated by arrow in FIGS. 15 and 17).

The spacing portion 221a of the slit-like spacing 221 downstream of the discharge ports 204a has a thickness equivalent to the sum of the thickness of the electrode sheet 202 and the thickness of the electrode piling agent applied on the sides of the electrode sheet 202. The spacing portion 221b located upstream of the intake ports 205a, on the other hand, is formed to have a thickness substantially equal to the thickness of the electrode sheet 202.

The lower blocks 208 at the lower end of the upstream space portion 221b have arranged therein seal members 211 in opposed relation to each other with the electrode sheet 202 held therebetween and extending up to a position outside of the side plates 222, 224 (FIG. 16). one of the seal members 211 is fixed in one of the lower blocks 208, and the other seal member 211 is urged toward the electrode sheet 202 by a spring 212 in the other lower block 208. With the seal member 211 thus urged toward the electrode sheet 202, each seal member 211, 211 is closely attached to the electrode sheet 202, so that the entrance for the electrode sheet 202 is sealed in the spacing 221.

The lower part of the slit-like spacing 221 through which the electrode piling agent is discharged is sealed by the seal members 211, 211, and the sides along the width of the electrode sheet 202 are sealed by the side plates 222, 224. The electrode piling agent thus is prevented from leaking downward or sideway.

The supply flow paths 204 have linear portions formed upstream of the discharge ports 204a. The linear portions 204c are arranged at an angle to the electrode sheet 202 in such a manner that the discharge ports 204a are located downstream along the direction of movement of the electrode sheet 202. The upstream end of each of the linear portions 204c is formed with a curved portion 204d. The supply flow paths 204 upstream of the curved portions 204d are extended horizontally. The portion of the supply flow paths 204 further upstream of the extended portions thereof have a progressively larger flow path area in upstream direction. The upstream end of each extended portion is formed with a supply port 204b. Further, an end (upper end) of an entrance flow path 204e formed in the middle block 207 is connected to communicate with the lower side of the supply port 204b. The other end (lower end) of each entrance flow path 204e, on the hand, is connected to communicate with a path not shown for supplying the electrode piling agent from a source external to the die elements 203.

As described above, since each linear portion 204c of the supply flow path 204 is formed at an angle to the electrode sheet 202, the electrode piling agent is discharged from the discharge port 204a forward diagonally along the direction in which the electrode sheet 202 moves, with the result that the coating work can be smoothly with high accuracy.

Also, each intake flow path 205 includes a linear portion 205c formed inclined upstream of the intake port 205a, a curved portion 205d formed at the upstream end of the linear portion 205c, an intake port 205b formed at the end of a horizontal extension thereof from the curved portion 205d, and an intake port 205e with an end thereof communicating with the intake port 205b and the other end thereof communicating with an intake means not shown external to the die elements 203. Each intake flow path 205 has the linear portion 205c thereof reduced in sectional area as compared with the intake port 205b or the curved portion 205d. The electrode piling agent discharged from the discharge ports 204a of the supply flow paths 204 and staying in the recesses 203b of the corresponding surfaces 203a can thus be efficiently absorbed.

Each upper block 208 has a fixed portion 206b fixed on a middle block 207 by a bolt 214, and a displaced portion 208a formed in the downstream spacing portion 221a of the spacing 221. The displaced portion 206a and the fixed portion 206b are coupled to each other by an adjust bolt 209. The adjust bolt 209 is horizontally movable with respect to the fixed portion 206b and has a screw section 209a at the forward end thereof forced into the displaced portion 206a. Under this condition, a head 209b is located outside of the fixed portion 206b. The adjust bolt 209 is formed with an operating section 209c extending further from the head 209b. The operating section 209c is projected from a block 210 mounted on the fixed portion 206b in such a manner as to cover the head 209b.

In this configuration, the rotation of the adjust bolt 209 through the operating section 209c bends and displaces the displaced portion 206a toward or away from each other thereby making it possible to adjust the width of the spacing portion 221a. By adjusting the width of the downstream spacing portion 221a, the thickness of the electrode piling agent coated on the two sides of the electrode sheet 202 is adjusted.

The die element pair 203, 203 is fixed on movable blocks 215, 215, into which ball screws 216, 216 extending laterally in FIG. 15 are forced. The ends of the ball screws 216, 216 are rotatably supported on mounting brackets 217, 219 on the bases 218, 218, respectively. When the operating sections 216a, 216a at the ends of the ball screws 216, 216 are rotatively operated, the movable blocks 215, 215 are moved laterally, respectively. This movement in turn causes the lateral movement of the die elements 203, 203.

In the process, the die elements 203, 203 are controlled to repeat the process of advancing toward and withdrawing from the electrode sheet 202 independently of each other in accordance with a coating pattern to be formed on the sides of the electrode sheet 202 by, for example, an AC servo motor coupled to the operating sections 216a, 216a of the ball screws 216, 216, respectively. When the die elements 203, 203 approach the electrode sheet 202 (position shown in FIG. 15), they are ready to coat the electrode piling agent, while the die elements 203, 203 enter a non-coating mode when they come away from the electrode sheet 202.

Each supply flow path 204 is caused by a pump mechanism not shown operatively interlocked with the entrance flow path 204c to continue to supply the electrode piling agent irrespective of whether the die elements 203 advance or withdraw. Each intake flow path 205, on the other hand, is controlled by a switch mechanism not shown arranged in an intake path 205e to start absorbing the electrode piling agent when the die element 203 begins to withdraw, and immediately after that, stops absorbing when the die element 203 completes the advance. The start and stop of absorption of the electrode piling agent by the intake flow path 205 is required to be accomplished in a moment, and therefore is preferably controlled by a valve.

The coating die 201 configured as mentioned above is operated as follows.

Figure 19A:
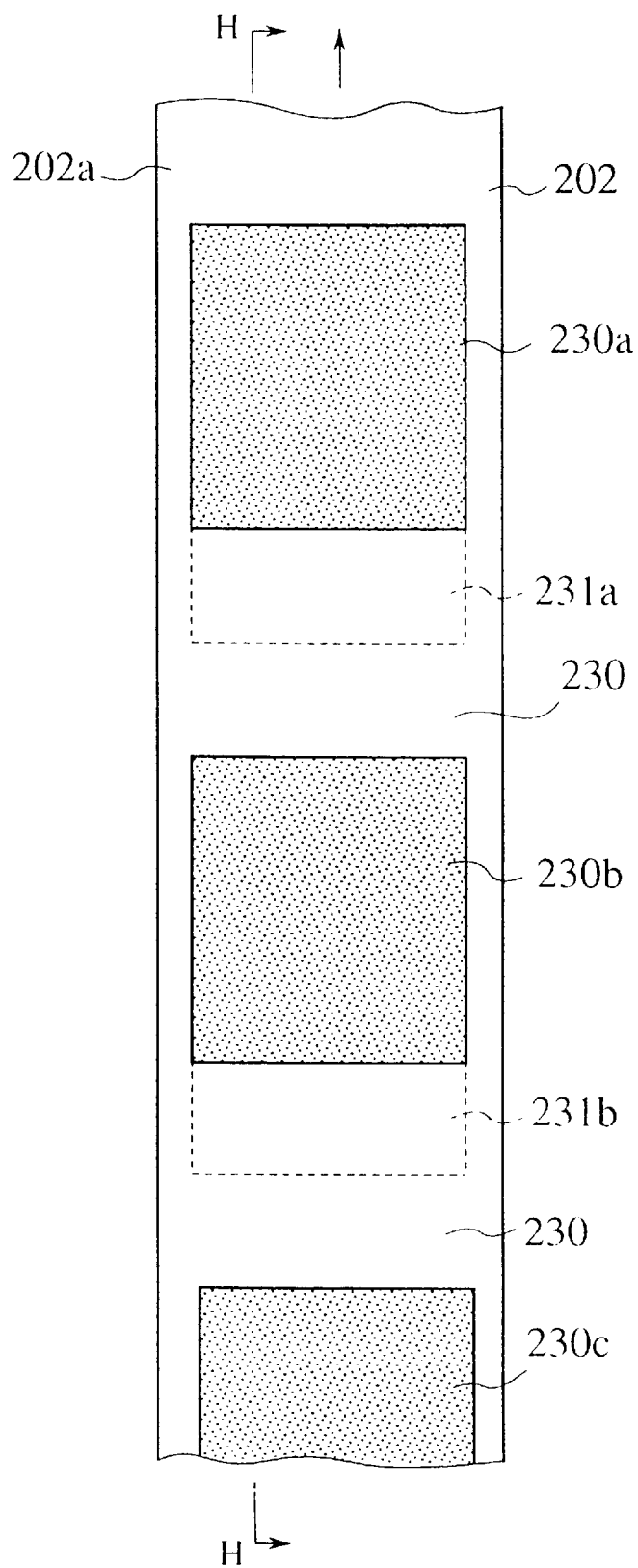
Figure 19B:
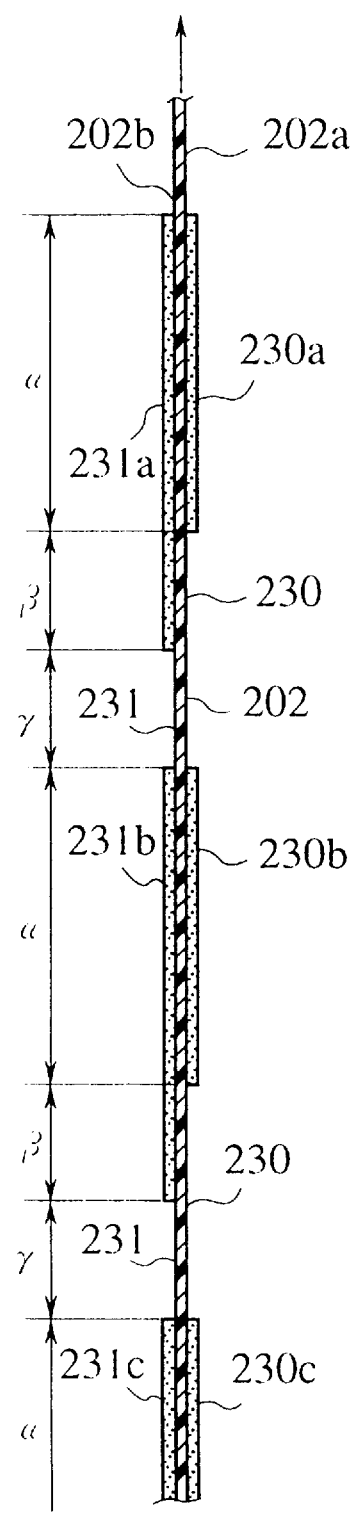

FIGS. 19A, 19B show coating patterns to be formed on the side coating surfaces 202a, 202b, respectively, of the electrode sheet 202. Specifically, the coating pattern to be formed on the coating surface 202a includes intermittent coating layers 230a, 230b, 230c and so on of the electrode piling agent with a non-coated portion 230 interposed between them. The coating pattern to be formed on the coating surface 202b, on the other hand, includes intermittent coating layers 231a, 231b, 231c and so on of the electrode piling agent with the non-coated portion 231 interposed between them.

In this coating die 201, as the electrode sheet 202 moves upward, the die elements 203, 203 and the intake flow paths 205 are controlled to operate in accordance with the coating patterns described above, thereby producing intermittent coating layers 230a, 230b, 230c, so on, and the intermittent coating layers 231a, 231b, 231c, so on, of the electrode piling agent conforming with the coating patterns described above. During the process of forming these intermittent coating patterns, the supply flow paths 204 continue to supply the electrode piling agent.

Figure 20A:
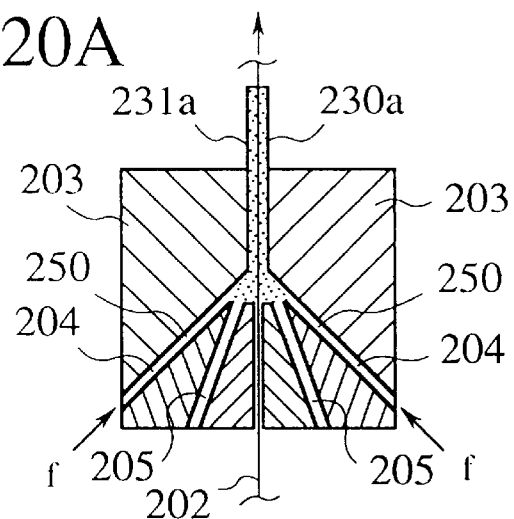
FIGS. 20A, 20B, 20C are diagrams showing the die element pair operating in each step of forming the intermittent coating layer of FIGS. 19A and 19B.

More specifically, in the α process where the coating layers 230a, 231a are to be formed at the same time as shown in FIG. 19B, the die element pair 203, 203 advances to the electrode sheet 202 to ready itself for coating as shown in FIG. 20A. The coating layers 230a, 231b are thus formed at the same time on the coating surfaces 202a, 202b on the sides of the electrode sheet 202 by means of the electrode piling agent supplied from the direction f of the supply flow paths 204. At this time, the intake flow paths 205, 205 of the die element pair 203, 203 remain without absorbing the electrode piling agent.

Figure 20B:
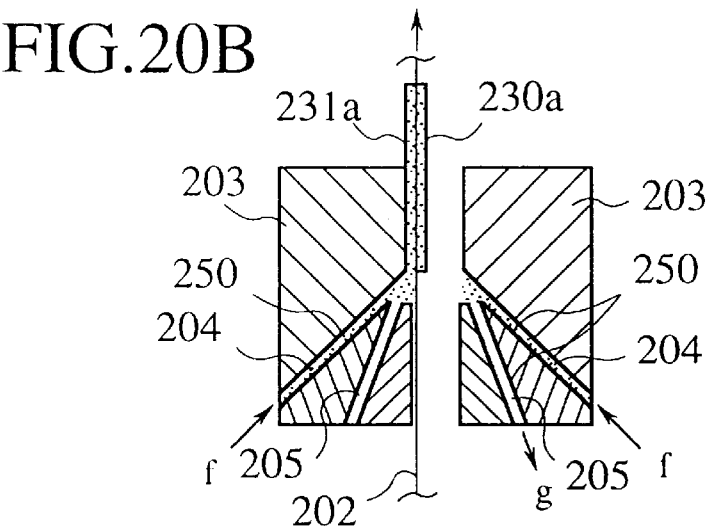

In the β process of ceasing to form the coating layer 230a and forming the coating layer 231b following the a process, on the other hand, as shown in FIG. 20B, one of the die elements 203 opposed to the coating surface 202a of the electrode sheet 202 withdraws from the electrode sheet 202 and is in non-coating mode, while the other die element 203 opposed to the coating surface 202b of the electrode sheet 202 remains in coating mode as in the α process. In the process, the intake flow path 205 of the first die element 203 begins to absorb the electrode piling agent along the direction g as the first die element 203 starts withdrawing, and continues to absorb the electrode piling agent while the the first die element remains in non-coating mode. As a result, the electrode piling agent stops being coated on the coating layer 230a, and the desired coating layer 230 can be formed. At the same time, the electrode piling agent 250 supplied from the supply flow path 204 is absorbed into the intake flow path 205 without any leakage. The other die element 203 continues to form the coating layer 231a as in the α process. In the process, the intake flow path 205 of the second die element 203 remains without absorbing the electrode piling agent.

Figure 20C:
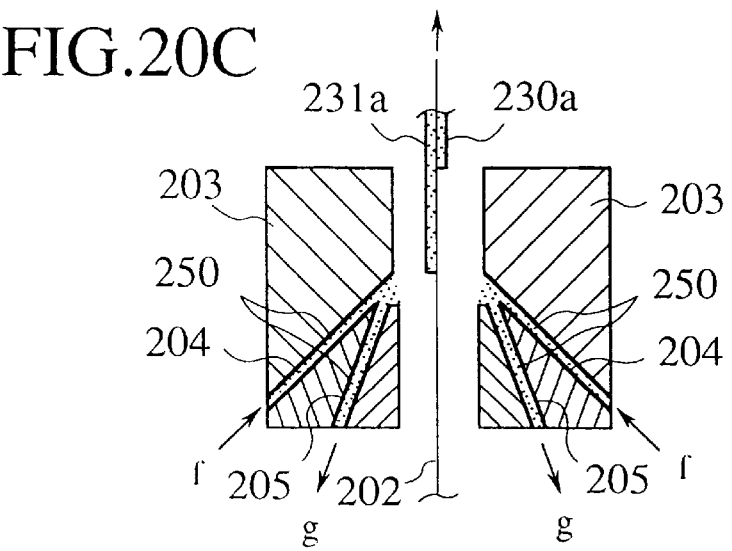

Further, in the γ process shown in FIG. 19B where the coating layer 230a remains without being formed as in the β process and the formation of the coating layer 231a is stopped, as shown in FIG. 20C, the first die element remains in non-coating mode as in the β process, while the second die element 203 also has entered the non-coating mode as it has withdrawn from the electrode sheet 202. At this time, the intake flow path 205 of the second die element 203 that started absorption along the direction g when the second die element 203 began to withdraw continues absorption as long as it is in non-coating mode. As a consequence, the coating layer 231a stops being formed, and the desired coating layer can be formed. At the same time, the electrode piling agent supplied from the supply paths 204 can be taken into the intake flow paths 205 without leaking.

Furthermore, in the second α process intended to form the coating layers 230b, 231b at the same time on the coating surfaces 202a, 202b on the two sides of the electrode sheet 202 shown in FIG. 19B, the die element pair 203, 203 that has so far been in non-coating mode advances toward the electrode sheet 202 and assumes the coating position as shown in FIG. 20A. As in the first α process, the coating layers 230b, 231b can be formed simultaneously on the coating surfaces 202a, 202b of the electrode sheet 202. In this process, the intake flow paths 205, 205 of the die element pair 203, 203 stop absorbing the electrode piling agent as the die elements 203 stop advancing toward the electrode sheet 202.

Subsequently, the α, β and γ processes are repeated according to the coating patterns to be formed, so that the desired intermittent coating layers 230a, 230b, 230c, so on, and the 231a, 231b, 231c, so on, can be formed simultaneously and continuously on the coating surfaces 202a, 202b of the electrode sheet 202.

In this coating die 201, the job is not required for setting the coating layers 230a, 230b, 230c, so on, and 231a, 231b, 231c, so on, in relative positions on the two surfaces of the electrode sheet 202, and therefore a battery electrode plate can be formed easily at low cost.

Also, in this coating die 201, the electrode piling agent 250 is discharged from the discharge ports 204a of the supply flow paths 204 while being maintained in a hermetically enclosed system out of contact with the air. Therefore, the electrode piling agent 250 is prevented from degenerating and the coating pressure can be improved.

Further, in this coating die 201, the dripping or leakage of the electrode piling agent 250 is prevented when the non-coated portions 230, 231 are formed. As a result, thickness variations of the coating layers 230a, 230b, 230c and 231a, 231b, 231c is prevented thereby to secure a uniform coating layer thickness for an Improved thickness accuracy.

Consequently, the coating die 1 makes it possible to fabricate a battery electrode plate of an improved quality.

What is claimed is:

1. A coating die for coating a liquid on a band-shaped base material, comprising:

a pair of die elements arranged in opposed relation to each other;

the pair of die elements defining a slit formed between opposing surfaces of said pair of die elements, said band-shaped base material being adapted to move through said slit; and a supply flow path for the coating liquid formed in each of said pair of die elements and having a discharge port open to said slit, the coating liquid being supplied from an external source through said supply flow path;

wherein a portion of said slit downstream of said discharge port along the direction of movement of said base material has a width equivalent to the thickness of said base material plus the thickness of the coating liquid coated on the sides of said base material, and a portion of said slit upstream of the discharge port in the direction of movement of said base material has a width equivalent to the thickness of said base material; and wherein the supply flow path for supplying the coating liquid has at least a portion linearly formed upstream of the discharge port, said linear portion being arranged at an angle to the base material in such a manner that the discharge port is located downstream of the supply flow path along the direction of movement of the base material.

2. A coating die for coating a liquid on a band-shaped base material, comprising:

a pair of die elements arranged in opposed relation to each other;

the pair of die elements defining a slit formed between opposing surfaces of said pair of die elements, said band-shaped base material being adapted to move through said slit; and a supply flow path for the coating liquid formed in each of said pair of die elements and having a discharge port open to said slit, the coating liquid being supplied from an external source through said supply flow path;

wherein a portion of said slit downstream of said discharge port along the direction of movement of said base material has a width equivalent to the thickness of said base material plus the thickness of the coating liquid coated on the sides of said base material, and a portion of said slit upstream of the discharge port in the direction of movement of said base material has a width equivalent to the thickness of said base material; and wherein said die element pair includes a non-coated portion forming member for forming a non-coated portion at a predetermined position along the width of said base material where the supply flow path is enclosed to prevent the coating liquid from being coated on the base material, said non-coated portion forming member being located upstream of the discharge port of the supply flow path in the direction of movement of the base material, and at least a non-coated portion holder, rotatable while in contact with the moving base material, for slidably holding the non-coated portion of the base material against an exit end of the slit of the die element pair through which the base material passes.

3. A coating die for coating a coating material on a band-shaped base material, comprising:

a pair of die elements each one of the pair of die elements facing an opposite side of the base material for coating the coating material on coating surfaces of said base material while the base material is moving through a slit formed by the pair of die elements facing one another;

each of said pair of die elements comprising a supply flow path having a discharge port on a surface of the die elements next to said coating surfaces of said base material, said supply flow path supplies the coating material, and an intake flow path having an intake port located below said supply flow path open to said coating surfaces and capable of withdrawing the coating material supplied from said discharge port by using suction means;

said pair of die elements attached to moving means for advancing and retreating the pair of die elements relative to the base material, said moving means being controlled independently of each other to repeat the process of advancing to and retreating from the base material in accordance with a coating pattern to be formed on the coating surfaces of the base material;

wherein said supply flow path continues to supply the coating material during advancement and retreat of said pair of die elements, and said suction means attached to the intake flow path starts withdrawing the coating material when one of said pair of die elements starts retreating from the base material, and the intake flow path stops withdrawing the coating material when said die element stops advancing toward the base material.

4. A coating die according to claim 3, wherein said coating material is a battery electrode piling agent, and said base material is a base material sheet for the battery electrode.

5. A method of coating a material on a moving band shaped base material, in a coating die comprising a pair of die elements, each one of the pair of die elements facing an opposite side of the base material, said pair of die elements forming a slit through which passes the band shaped base material, a coating material supply flow path in each of the die elements having a discharge port open on a surface of the pair of die elements next to a coating surface of the moving band-shaped base material, and an intake flow path having an intake port located below said supply flow path open on the surface of the pair of die elements for withdrawing the coating material supplied from said discharge port, by using suction means said pair of die elements being attached to moving means for advancing and retreating from the band shaped base material independently of each other in accordance with a coating pattern to be formed on the coating surfaces of said base material, while at the same time activating and deactivating the operation of supplying and withdrawing the coating material, comprising the steps of:

starting the suction means attached to the intake flow path to start withdrawing the coating material while the supply flow path continues to supply the coating material when said pair of die elements start retreating from a position near the base material; and stopping the suction means attached to said intake flow path to stop withdrawing the coating material while the supply flow path continues to supply the coating material when said pair of die elements stop advancing to the position near the base material.

6. A device for coating a coating liquid, supplied from an external source, on a first coating region of an upwardly advancing sheet of base material, the device comprising:

a first die block member having a substantially vertical first wall;

a second die block member having a substantially vertical second wall;

said first and second walls defining a slit therebetween, said slit comprising:

an entrance portion dimensioned to permit the sheet of base material to enter the slit from thereunder;

an exit portion dimensioned to permit the sheet of base material with a first coat to exit from the slit;

discharge ports located between said entrance portion and said exit portion in each of said first and second walls;

one of said discharge ports connected to a first supply flow path provided through the first die block member for supplying the coating liquid therethrough to the coating region under a controlled pressure and one of said discharge ports connected to a second supply flow path provided through the second die block member for supplying the coating liquid therethrough to the coating region under a controlled pressure;

said first and second supply flow paths converging toward said first and second walls from an upstream location in said first and second die block members to a downstream location in said first and second die block members, wherein said first and second supply flow paths converge to said discharge ports, one of said discharge ports applying a first body of coating material on the first coating region to form a first coat thereon:

a lower slit portion provided between the entrance portion and the discharge ports dimensioned to permit the sheet of base material to advance therethrough while sealed from an outside atmosphere; and an upper slit portion provided between the discharge ports and the exit portion dimensioned to permit the sheet of base material with the first coat to advance therethrough while sealed from the outside atmosphere.

7. The device according to claim 6, wherein the first and second supply flow paths include:

supply ports for receiving the coating liquid, disposed on surfaces of the first and second die block members, at an elevation below the elevation of the discharge ports; and said discharge ports attached to said supply ports by means of said first and second supply flow paths.

8. The device according to claim 7, wherein the first and second supply flow paths further include upwardly inclined passages connected to the discharge port extending from the supply port.

9. The device according to claim 7, wherein a lower edge portion of the discharge port extends downward to define an upper end portion of the lower slit.

10. The device according to claim 6, further comprising:
a guide member partially extending across a converging coating portion attached to the first and second die member blocks near the discharge ports, for guiding the coating liquid to a desired region smaller in horizontal width than the first coating region, so that a portion of the first coating region is not coated.

11. The device according to claim 10, wherein the guide member is in sliding contact with the base material.

12. The device according to claim 6, further comprising:
a first drive for horizontally displacing the first die block member; and
a first intake flow path located below the supply flow path attached to a suction means for removing a portion of the coating liquid supplied by the first supply path to the discharge ports.

13. The device according to claim 12, herein the first intake flow path removes the coating liquid while the first die block member is displaced from a position where it cooperates with the second die block member to define the slit.

14. The device according to claim 12, wherein:
the second die block has a discharge port placed on said second wall connected to a coating supply port for coating a coating liquid on a second coating region of the sheet of base material, opposite to the first coating region;

the discharge ports dimensioned to permit the coating liquid to be applied on the second coating region to form a second coat thereon;

the exit portion dimensioned to permit the sheet of base material with the first and second coats to exit from the slit;

the device further comprises;
a second drive for horizontally displacing the second die block member; and
a second intake flow path located below said second supply flow path and attached to suction means for removing a portion of the coating liquid supplied by the second supply flow path to the discharge ports.

* * * * *